(12) United States Patent
Neiser et al.

(10) Patent No.: US 9,790,035 B2
(45) Date of Patent: Oct. 17, 2017

(54) GAPPING SYSTEMS AND METHODS

(71) Applicant: Intelligrated Headquarters, LLC, Mason, OH (US)

(72) Inventors: Raymond R. Neiser, Batavia, OH (US); Brian J. Resnick, West Chester, OH (US); Ralf Buerkle, Oregonia, OH (US)

(*) Notice: Subject to any disclaimer, the term of this patent is extended or adjusted under 35 U.S.C. 154(b) by 0 days.

(21) Appl. No.: 15/355,424

(22) Filed: Nov. 18, 2016

(65) Prior Publication Data
US 2017/0073168 A1    Mar. 16, 2017

Related U.S. Application Data

(63) Continuation of application No. 14/719,588, filed on May 22, 2015, now Pat. No. 9,527,679.

(60) Provisional application No. 62/002,708, filed on May 23, 2014.

(51) Int. Cl.

| B65G 43/10 | (2006.01) |
| B65G 43/08 | (2006.01) |
| G05B 19/418 | (2006.01) |
| B65G 47/26 | (2006.01) |
| B65G 37/00 | (2006.01) |
| B65G 47/30 | (2006.01) |
| B65G 47/31 | (2006.01) |
| B65G 21/14 | (2006.01) |

(52) U.S. Cl.
CPC .......... *B65G 43/10* (2013.01); *B65G 21/14* (2013.01); *B65G 37/00* (2013.01); *B65G 43/08* (2013.01); *B65G 47/26* (2013.01); *B65G 47/30* (2013.01); *B65G 47/31* (2013.01); *G05B 19/4189* (2013.01)

(58) Field of Classification Search
CPC ................................ B65G 43/08; B65G 43/10
See application file for complete search history.

(56) References Cited

U.S. PATENT DOCUMENTS

| 5,267,638 | A | * | 12/1993 | Doane | B65G 43/08 198/357 |
| 6,629,593 | B2 | * | 10/2003 | Zeitler | B65G 43/08 198/460.1 |
| 7,264,109 | B2 | * | 9/2007 | Raque | B65G 43/10 198/460.1 |
| 8,042,677 | B2 | * | 10/2011 | Konig | B65G 43/10 198/460.1 |
| 8,201,681 | B2 | * | 6/2012 | Schiesser | B65G 43/08 198/460.1 |
| 8,800,750 | B2 | * | 8/2014 | Buchberger | B65G 43/10 198/461.1 |
| 9,067,741 | B2 | * | 6/2015 | Acerbis | B65G 47/084 |
| 9,150,362 | B2 | * | 10/2015 | Vegh | B65G 43/08 |
| 2001/0035332 | A1 | * | 11/2001 | Zeitler | B65G 43/08 198/464.3 |

(Continued)

*Primary Examiner* — Thomas Randazzo

(57) ABSTRACT

Various embodiments provide systems and methods for providing a desired gap between articles within a continuously flowing train of articles. Various embodiment methods may include operating a material handling system including a plurality of conveying units, by generating motion profiles for a plurality of articles to provide a pre-determined gap between the articles, and controlling the plurality of conveying units to move each article in accordance with its motion profile as the plurality of articles move through the material handling system.

18 Claims, 17 Drawing Sheets

(56) References Cited

U.S. PATENT DOCUMENTS

| 2008/0023302 A1* | 1/2008 | Groom | B65G 47/268 |
| | | | 198/781.06 |
| 2008/0082206 A1* | 4/2008 | Egami | B65G 47/31 |
| | | | 700/230 |
| 2009/0171501 A1* | 7/2009 | Hills | B64F 1/368 |
| | | | 700/230 |

* cited by examiner

GAPPING SYSTEMS AND METHODS

CROSS-REFERENCE TO RELATED APPLICATIONS

The present application is a continuation of U.S. patent application Ser. No. 14/719,588 entitled "Gapping System and Methods", filed on 22 May 2015, which issued as U.S. Pat. No. 9,527,679 B1 on 27 Dec. 2016, and which in turn claims the benefit of priority under 35 U.S.C. §119(e) to U.S. Provisional Application Ser. No. 62/002,708 entitled "Gapping System and Methods" filed 23 May 2014, the contents of both of which are incorporated herein by reference in their entirety.

BACKGROUND

1. Technical Field

The present disclosure relates generally to material handling systems, and is more particularly directed to gapping methods and systems that provide a desired gap between articles (e.g., cartons) within a continuously flowing train of articles.

2. Description of the Related Art

Establishing a correct gap between cartons within a continuously flowing train of cartons has become an increasingly difficult problem to solve over the last several decades. At low speeds, there is no real challenge. For example, if two cartons, traveling at 100 feet per minute (FPM) have only 1 inch of gap between them, but require 12 inches, the control system can easily create the required gap, because (at 0.5 g) the second carton can be stopped within an inch of travel after the previous carton has exited the conveyor. However, as the speed of the cartons increases, the conveyor takes longer to stop (at the same deceleration rate). Also, the carton is traveling at a higher average speed during that extended time. Hence, the distance required to stop a carton increases with the square of the increase in speed.

As a result, at 600 FPM, the travel distance which the second carton requires in order to increase the gap between itself and the previous carton (constantly moving at 600 FPM) by 11 inches is 46 inches. Obviously, there is not nearly enough space available to effect this change after the first carton exits the controlling conveyor.

Conventional single-stage gapping units must either give up or release at a speed which will usually cause the required gap to be "pulled" between the cartons. This method, while it can be reasonably effective with exotic algorithms applied, is based on assumed weight transfer points for cartons and inadvertently effects gapping of neighboring cartons. The result, unavoidably, is a level of ineffectiveness that worsens at higher speeds.

FIG. 1 illustrates a generally-known material handling system 100 that changes a gap between cartons 101, 102 utilizes a series of variable speed conveyors 104 of about three to four feet long. This initial gap is read on a fixed speed infeed conveyor 106 by a sensor such as a photo eye sensor 108. Speed and location of the cartons 101, 102 is tracked initially on the infeed conveyor 106 by monitoring an output from a rotary encoder 110 in relation to when a leading edge or trailing edge of a carton 101, 102 passes the photo eye sensor 108. The lead article 101 in this instance is transported at a velocity $V_{IN}$ on the infeed conveyor 106. The lead article is transported at a constant velocity $V_{out}$ subsequently on the series of variable speed conveyors 104 that discharge onto a transport conveyor 112. On each of the series of variable speed conveyors 104, the position of the cartons 101, 102 is sensed by a respective photo eye sensor 108. Each variable speed conveyors 104 also includes a rotary encoder 110. In addition the significant amount of equipment thought necessary to dynamically track each carton 101, 102, the amount of gapping adjustment achievable at each variable speed conveyors 104 is limited. For example, the initial gap is determined at time $t_0$. At time $t_j$, both cartons 101', 102' have moved onto a first variable speed conveyors 104. When the following carton 102 is detected, the material handling system 100 waits for a period of time until time $t_k$ to allow the lead carton 101" to transition to a second variable speed conveyor 104. The first variable speed conveyor 104 can then change velocity to affect a gap of the following conveyor 102" for a short period of time that the following conveyor 102" remains on the first variable speed conveyor 104. Subsequent variable speed conveyor 104 sense the cartons 101, 102 again respectively and make their own small contributions to affecting the gapping. Eventually, at time $t_f$ cartons 101''', 102''' each the transport conveyor 112 at the target gap spacing.

The generally-known material handling system 100 is quite lengthy in addition to requiring dynamic sensing during control of each conveyor stage. Their systems detect a carton and its leading gap as a carton enters a varying speed conveyor, the algorithm must wait for the prior carton to exit before it can affect a change to the gap, otherwise if both cartons were on the same conveyor, they would both move at the same speed and the gap would not change. Thus, the varying speed conveyor must be longer than the average carton plus the gap, and for best performance, it must be longer than the longest carton. Our system is a plurality of short belts—in our test system they are 6-inches long.

BRIEF SUMMARY

In one aspect, the present disclosure provides a method for operating a material handling system to achieve desired gapping of conveyed articles. In one or more embodiments, the method includes sensing on an infeed conveyor an initial gap between a lead article and a following article. The method includes prior to the lead and following articles transporting onto a series of variable speed conveying units, generating, by a computing device, a motion profile for the following article based at least in part on the initial gap between the articles and a target final gap as the articles are discharged from the series of variable speed conveying units. For each interval of time as the lead and following articles are conveyed across the series of variable speed conveying units, the method includes: (i) determining an assigned velocity and a resulting distance that the following article has conveyed on the series of variable speed conveying units based upon the motion profile at the particular interval of time; (ii) determining a particular conveying unit that corresponds to the resulting distance; and (iii) controlling, by the computing device, the particular conveying unit to operate at the assigned velocity.

In another aspect, the present disclosure provides a computing device having a processor configured with processor-executable instructions to perform operations including sensing on an infeed conveyor an initial gap between a lead article and a following article. Prior to the lead and following articles transporting onto a series of variable speed conveying units, the processor performs operations including generating, by a computing device, a motion profile for the following article based at least in part on the initial gap between the articles and a target final gap as the articles are discharged from the series of variable speed conveying units. For each interval of time as the lead and following articles are conveyed across the series of variable speed conveying units, the processor performs operations including: (i) determining an assigned velocity and a resulting distance that the following article has conveyed on the series of variable speed conveying units based upon the motion profile at the particular interval of time; (ii) determining a particular conveying unit that corresponds to the resulting distance; and (iii) controlling, by the computing device, the particular conveying unit to operate at the assigned velocity.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
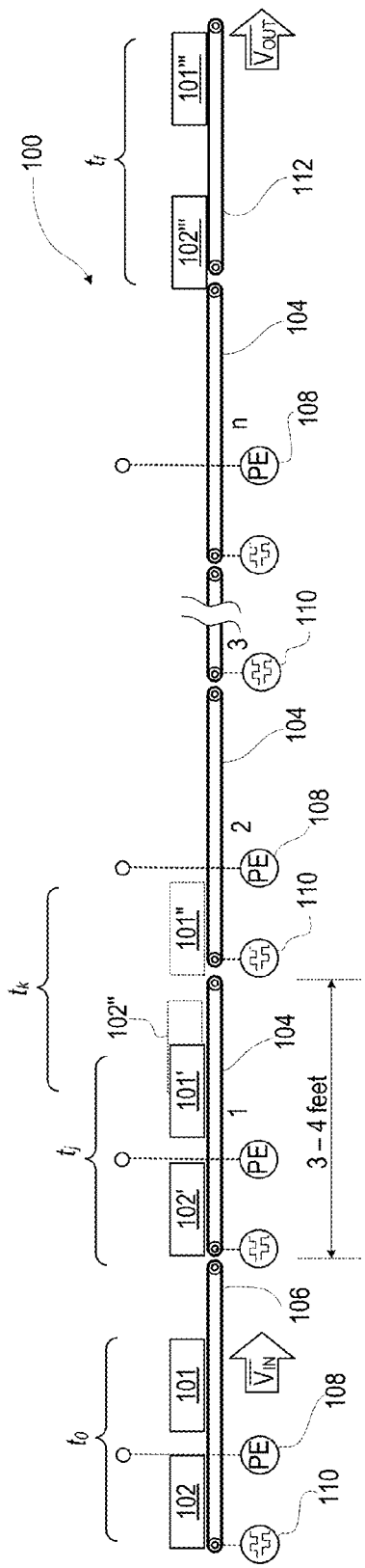
FIG. 1 illustrates a component block diagram of a generally-known series of conveyors for gapping that dynamically senses position of each article on each conveyor.
Figure 2:
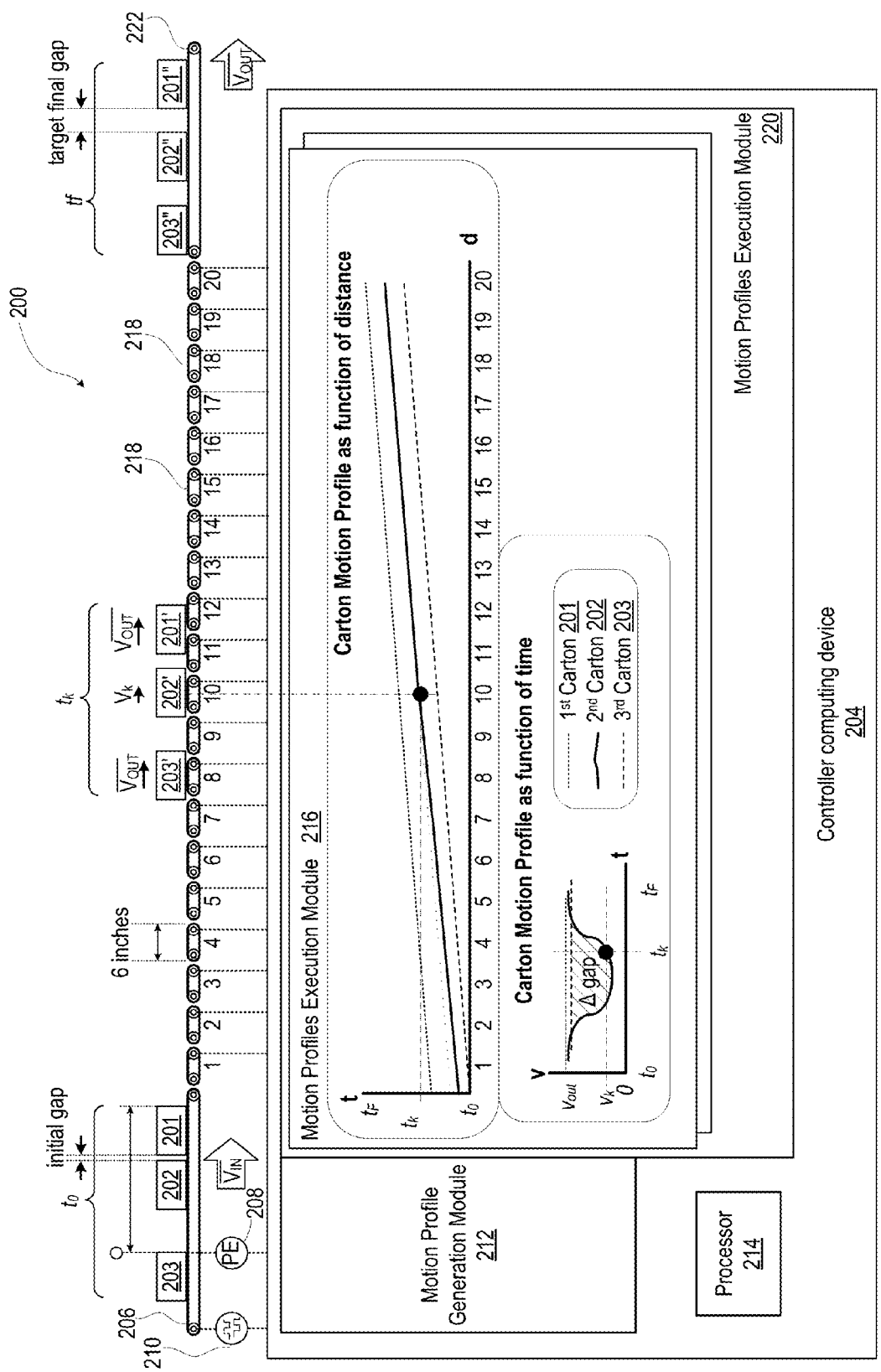
FIG. 2 illustrates a component block diagram of a motion profile controlled series of conveying units, according to one or more embodiments.

FIG. 2 illustrates a material handling system 200 that adjusts gapping between a train of articles 201, 202, and 203 by a controller computing device 204. Lead article 201 and following article 202 are advancing on infeed conveyor 206 after having a their respective locations sensed by a photo eye (PE) sensor 208 at a particular time relation to a constant infeed velocity ($V_{IN}$) measured by a rotary encoder 210. In other embodiments, other sensors can be used such as machine vision, etc. A motion profile generation module 212 of the controller computing device 204 executes on a processor 214 to generate a motion profile 216 for each of the articles 201, 202. Upstream article 203 has just reached the PE sensor 208 at time $t_0$.

During incremental units of time such as time $t_k$ after the articles 201', 202', and 203' discharge from the infeed conveyor 206 onto a series of variable speed conveying units 218, a motion profiles execution module 220 executes on the processor 214 to individually control a velocity of each conveying unit 218 according to applicable motion profiles 216. Without sensing of location of the articles 201, 202, and 203 on the series of variable speed conveying units 218, the controller computer device 204 determines a distance that the particular article 201', 202', and 203' should have traveled according to the respective motion profile 216. With the distance information, the controller computing device 204 determines one or more conveying units 218 that are in contact with each article 201', 202', and 203' at the particular time. In addition, the respective motion profile 216 dictates an assigned velocity at which the determined one or more conveying units 218 should be operating so that eventually the articles 201", 202", and 203" are discharged at time $t_f$ onto a discharge transport conveyor 222 at an output velocity ($V_{OUT}$) and at a target final gap.

Figure 3A:
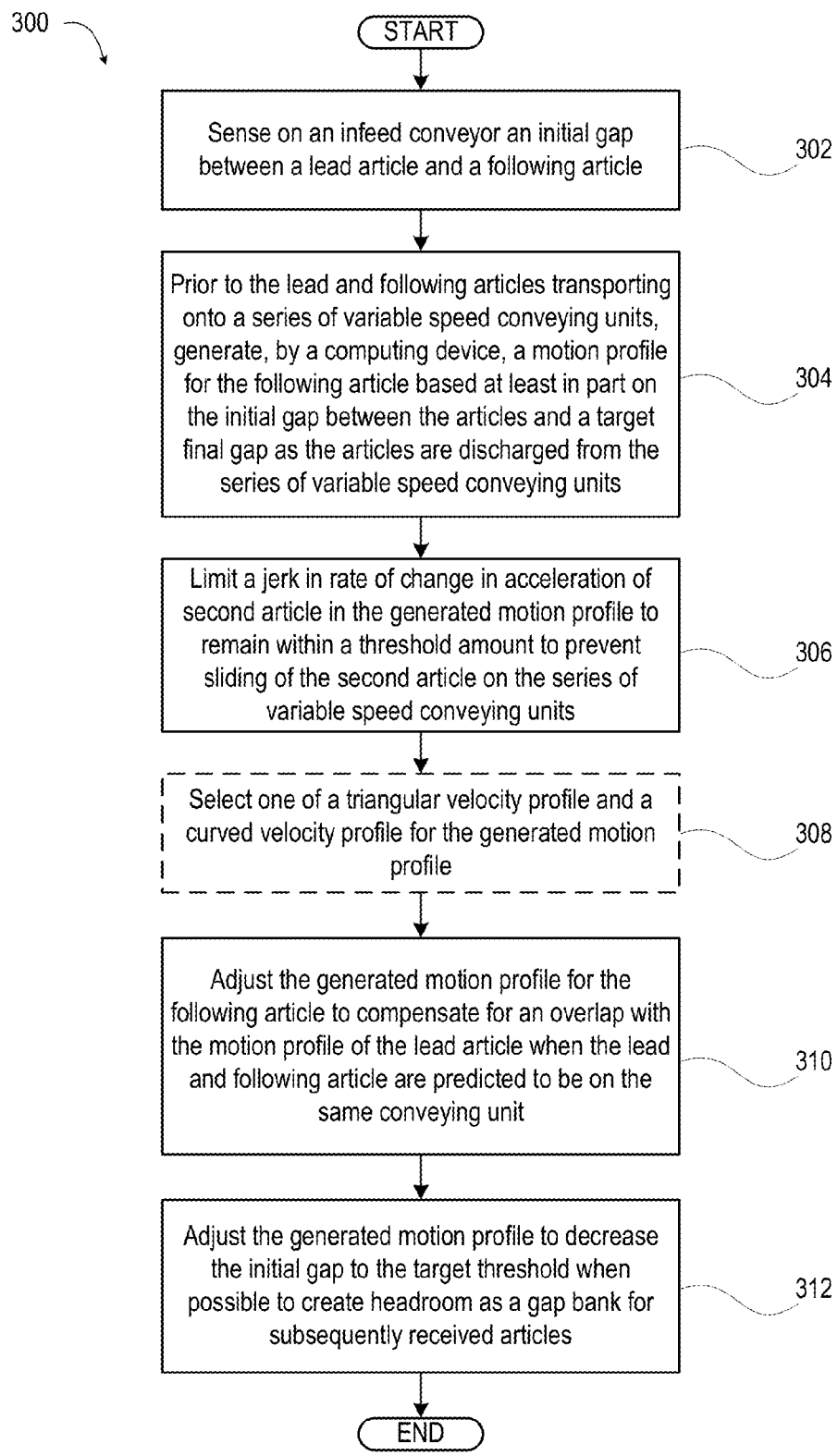
FIG. 3A illustrates a flow diagram of a method of generating a motion profile for articles conveyed on a series conveying unit to achieve desired gapping, according to one or more embodiments.

FIG. 3A illustrates a method 300 for operating a material handling system to achieve desired gapping of conveyed articles by generating motion profiles prior to entering a series of conveying units. In one or more embodiments, the method 300 includes sensing on an infeed conveyor an initial gap between a lead article and a following article (block 302). Method 300 includes prior to the lead and following articles transporting onto a series of variable speed conveying units, generating, by a computing device, a motion profile for the following article based at least in part on the initial gap between the articles and a target final gap as the articles are discharged from the series of variable speed conveying units (block 304). Method 300 includes determining a motion profile generated for the lead article by limiting a jerk in rate of change in acceleration of second article to remain within a threshold amount to prevent sliding of the second article on the series of variable speed conveying units (block 306). In exemplary embodiments, method 300 includes limiting the jerk in the rate of change in acceleration by following a selected one of a triangular velocity profile and a curved velocity profile (block 308). Method 300 includes adjusting the generated motion profile for the following article to compensate for an overlap with the motion profile of the lead article when the lead and following article are predicted to be on the same conveying unit (block 310). In an exemplary embodiment, method 300 includes adjusting the generated motion profile to decrease the initial gap to the target threshold when possible to create headroom as a gap bank for subsequently received articles (block 312). Then method 300 ends. For clarity, one iteration of detecting another article on the infeed conveyor and generating a corresponding motion profile is described, however, in exemplary implementations, a train of articles are sensed and profiled as each article is conveyed across the infeed conveyor.

Figure 3B:
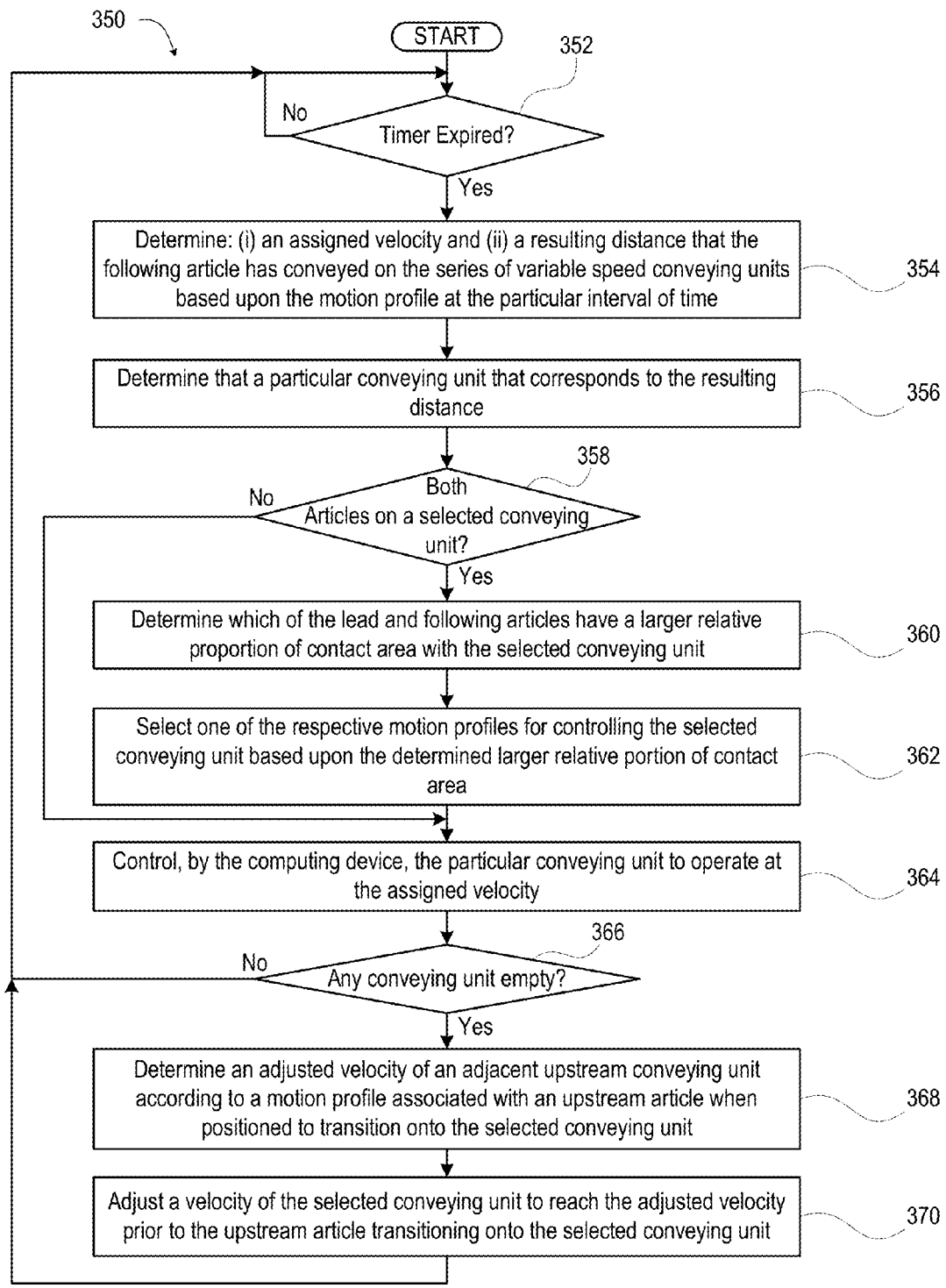
FIG. 3B illustrates a flow diagram of a method of executing a motion profile for articles conveyed on a series conveying unit to achieve desired gapping, according to one or more embodiments.

FIG. 3B illustrates a method 350 for operating a material handling system to achieve desired gapping of conveyed articles based on previously generated motion profiles. For each interval of time as the lead and following articles are conveyed across the series of variable speed conveying units, method 350 includes determining whether a timer has expired indicating a new interval of time to update speed settings for each of a plurality of variable speed conveying units (decision block 352). In response to determining that the timer has not expired in decision block 352, then method 350 returns to decision block 352. In response to determining that the timer has expired in decision block 352, then method 350 includes determining: (i) an assigned velocity and (ii) a resulting distance that the following article has conveyed on the series of variable speed conveying units based upon the motion profile at the particular interval of time (block 354). Method 350 includes determining that a particular conveying unit that corresponds to the resulting distance (block 356). Method 350 includes determining based on the respective motion profiles whether the lead and following articles will both have a least a portion of their respective length on a selected conveying unit (decision block 358). In response to determining based on the respective motion profiles that the lead and following articles will both have a least a portion of their respective length on a selected conveying unit in decision block 358, method 350 includes determining which of the lead and following articles have a larger relative proportion of contact area with the selected conveying unit (block 360). Method 350 includes selecting one of the respective motion profiles for controlling the selected conveying unit based upon the determined larger relative portion of contact area (block 362). In one or more embodiments, approximations of the larger relative contact area can be used such as based on a longer article or defaulting to the lead article, etc. In response to determining based on the respective motion profiles that the lead and following articles will not have a least a portion of their respective length on a selected conveying unit in decision block 358 or subsequent to performing block 362, method 350 includes controlling, by the computing device, the particular conveying unit to operate at the assigned velocity (block 364). Method 350 includes determining whether any conveying unit is empty based on analyzing all active motion profiles at the current time interval (decision block 366). In response to determining that a particular conveying unit is empty based on analyzing all active motion profiles at the current time interval in decision block 366, method 350 includes determining an adjusted velocity of an adjacent upstream conveying unit according to a motion profile associated with an upstream article when positioned to transition onto the selected conveying unit (block 368). Method 350 includes adjusting a velocity of the selected conveying unit to reach the adjusted velocity prior to the upstream article transitioning onto the selected conveying unit (block 370). In response to determining that no conveying unit is empty based on analyzing all active motion profiles at the current time interval in decision block 366 or after performing block 370, method 350 returns to block 352 to continue adjusting velocities for each of the plurality of conveying units.

The various embodiments provide systems and methods for providing a desired gap between articles within a continuously flowing train of articles. The various embodiments may be implemented in a material handling system which may move a plurality of articles, such as cartons, using one or more conveying mechanisms (e.g., conveyor belts). The embodiments may also be used for an induct conveyer in a loop sorter where the gapping may be used to time the induct to match a particular tray or cross belt going by the induct. Additionally, the various embodiments may enable articles fed to a sorter, such as a sliding-shoe sorter, to be aligned with slats of the sorter.

SEQUENTIAL, INDEPENDENT, MULTI-TRANSITION GAPPING: A first technique for providing a desired gap between articles (e.g., cartons) within a continuously flowing train of articles includes utilizing multiple (2 to n) belts (e.g., conveyer belts) with multiple conveyer transitions at which the gaps between articles may be adjusted. This concept relies on a sufficient number of controlled transitions to effect the total gap adjustment required.

In the case where the gap needs to be increased, since the gap is increased at each transition, the next downstream transition has more distance (space) to further effect an increase. Each transition, therefore, can be increasingly effective. Conversely, in the case where the gap needs to be decreased, the available space, in which to effect a change, progressively decreases.

One may mathematically arrive at the optimum number of belts required and implement a solution that would result in perfect gap (within a small tolerance) between any two given articles (e.g., with a maximum starting gap of about 24 inches). However, this does not account for the impact those adjustments would have on other articles upstream and downstream of the pair.

The most common control schemes make adjustments at the individual transitions with little or no regard for the resultant side effects on other articles (although they do account for downstream conveyor ongoing speed variations occurring for downstream adjustments).

More sophisticated control schemes may schedule or vary the adjustments to minimize the negative side effects on article gaps at neighboring transitions. Such an arrangement has two primary limitations. Specifically, adjustments can inadvertently have adverse effects on article gaps at neighboring conveyor transitions. Also, there may be a problem of compounding acceleration/deceleration rates. For example, if belt "A" needs to slow down at the maximum deceleration rate in order to open a gap between the last released article (currently on belt "B") and the next to release article, but the downstream belt "B" is also in a maximum deceleration mode in order to further open a downstream gap relative to an article on belt "C", belt "A" cannot slow down relative to belt "B" and is therefore ineffective in adjusting the gap.

The various embodiments described herein may address one or more of these problems associated with the control schemes described above.

Figure 4:
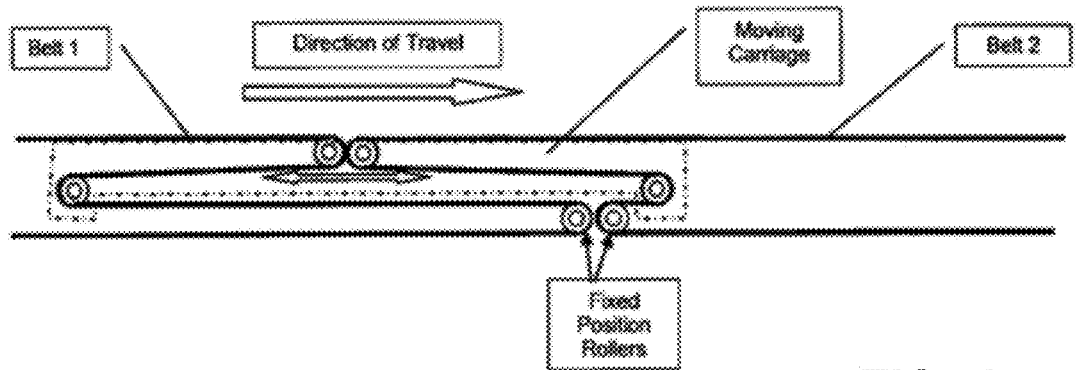
FIGS. 4-6 schematically illustrate an embodiment of a material handling system having a carriage that physically moves the transition(s) between upstream and downstream conveying belts.
Figure 5:
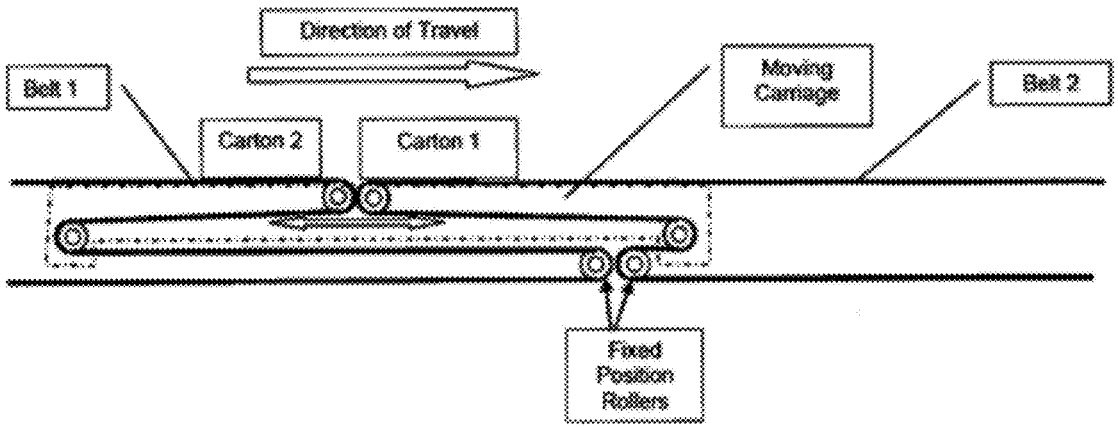
Figure 6:
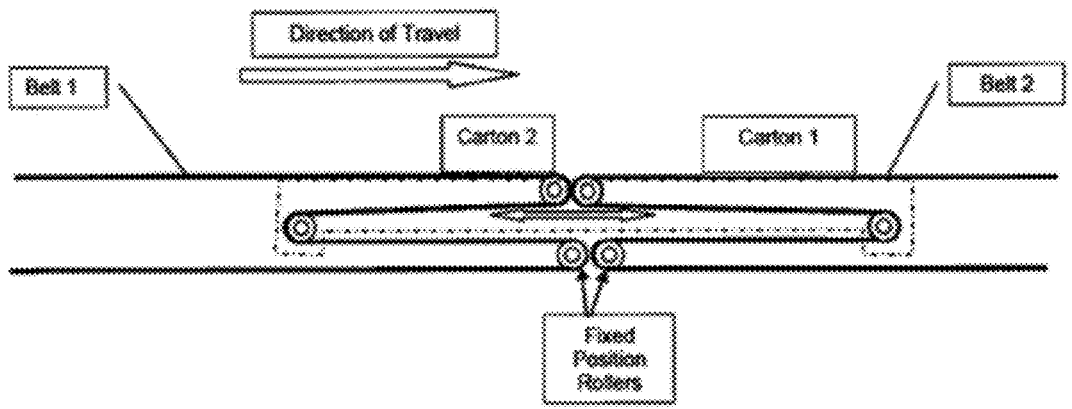

SINGLE TRANSITION WITH MECHANICALLY VARIABLE TRANSITION POSITION: FIGS. 4-6 illustrate an embodiment of a material handling system having a carriage which is configured to physically move the transition(s) between upstream and downstream belts. As shown in FIG. 4, the carriage may be controlled by a system controller to move (parallel to the direction of belt travel) the transition between the upstream and downstream belts. A common single transition gapping conveyor is commonly not effective at high speeds because there is not enough travel distance available to the second article after the first article passes the transition. The second article requires enough distance in order to effect a gently controlled speed change sufficient to make the required gap adjustment.

In the embodiment system shown in FIGS. 4-6, after carton 1 passes the transition (see FIG. 5), the carriage may physically move the transition in the same direction as carton travel. The transition may remain just ahead of carton 2, long enough to give carton 2 the travel distance it needs for belt 1 to slow down enough to effect the required gap adjustment (see FIG. 6). Once the gap adjustment has been made and the speed of belt 1 again matches the speed of belt 2, the transition may quickly move back to its original position or to the front edge of the next carton, whichever is nearer. The same concept, with belt 1 speeding up to a speed faster than belt 2, may also be used for reducing large gaps.

The system of FIGS. 4-6 may be effectively utilized to provide a desired gap between articles (e.g., cartons) within a continuously flowing train of articles. In some cases, repeated movements of the transition may result in a "creep" movement of the transition in the downstream direction. For example, at 600 FPM, with consecutive 9 inch cartons having only 1 inch gaps, and a need to open these gaps to 11 inch, the required transition movement may result in approximately 34 inch "creep" (in the downstream direction) per gap adjustment. Hence, the system of FIGS. 4-6 may be most effective in cases in which there are a limited number of such carton gaps consecutively (e.g., where the system only has to deal with 4 or 5 such carton gaps consecutively, which may result in .about.12-15 foot transition range of motion).

SINGLE TRANSITION WITH CONCURRENT INDEPENDENT ARTICLE MOTION PROFILES: Further embodiments may utilize a series of consecutive, separately powered and/or separately controllable conveying units. The conveying units may be, for example, individually powered rollers (or groups of rollers), short belt conveyors, short strip belt conveyors, or some combination thereof. Other possible conveying units may also be utilized. The conveying units may be arranged such that each independently powered section will affect the motion of only one article at a time. This allows a motion profile (e.g., a velocity profile, acceleration profile, etc.) to be executed for a given article without affecting the motion profile for any other article.

If a given unit affected the motion of more than one article at a time, the motion profile for one article necessarily impacts a neighboring article. This generally prevents using the most effective profile for either article.

Various embodiments may enable the use of independent, truly concurrent motion profiles (e.g., velocity profiles, acceleration profiles, etc.). The logic, when planning a given article's motion profile, must still take the neighboring articles into account. However, that is consistent with a primary purpose of such a unit: to readjust, as necessary, a given article's position relative to neighboring articles.

A difference in the various embodiments is that the execution of article motion profiles (e.g., velocity profiles, acceleration profiles, etc.), relative to the discharge point of the unit, may be concurrent. In most conventional systems, the execution of article motion profiles, relative to the discharge point of the unit, is sequential.

Various embodiments may implement gap control by generating pre-planned article (e.g., carton) motion profiles (e.g., velocity profiles, acceleration profiles, etc.) and causing the power units which exert influence on the article's motion to inherit the article's motion profile. As articles traverse a given unit, the unit runs at a speed and acceleration rate consistent with the article's motion profile. As that article exits the unit, the unit may abandon that article's profile and inherit the profile of the next arriving article. Should a situation occur in which the unit is exerting influence over two articles simultaneously, in the various embodiments the unit may inherit the profile for the article which it more completely controls.

The length and quantity of the individual units may vary according to the requirements of the system. In determining the length of the individual units, the following factors may be considered: Minimum article length being handled. Minimum starting gap to be expanded. Whether the length of the units should be uniform or variable across the system. For example, the lengths of the units may be variable with the length of the units getting longer as the article gaps expand. However, because motion profiles may need to start at any point in the gapping system, the length of the units may be as short as possible. The number of consecutive, difficult gap adjustments the gapping system is required to execute.

Figure 7:
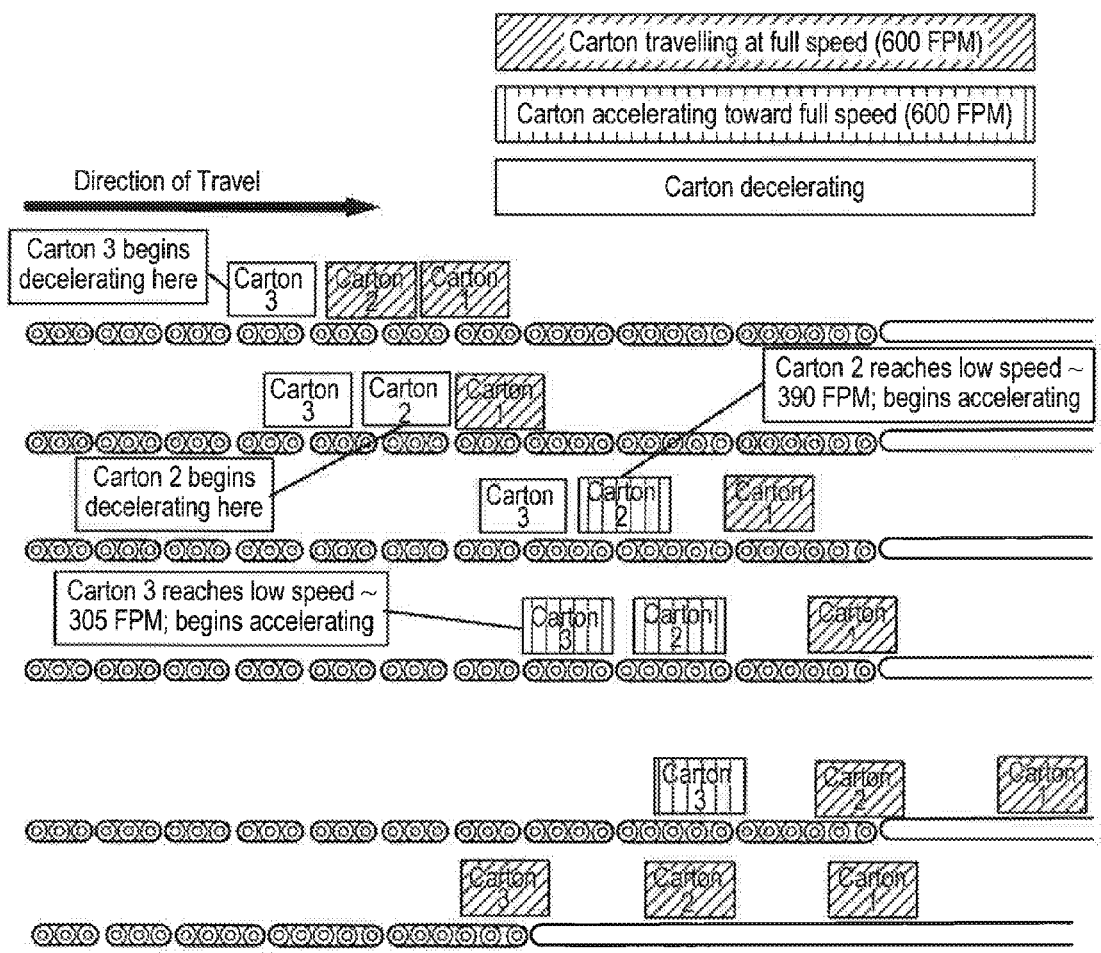
FIG. 7 is a series of illustrations showing the operation of an embodiment of a gapping system that includes a series of consecutive, separately controllable conveying units according to an embodiment.

FIG. 7 is a series of illustrations which show the operation of an embodiment of the gapping system. In the illustrations, it is assumed that the system will be fed by a brake/metering conveyor, which may be used to detect and measure the arriving cartons and provide a minimal starting gap. The embodiment in FIG. 7 assumes 9 inch cartons, 1 inch starting gaps, 11 inch final gaps, base conveyor speed of 600 FPM (although higher speeds up to and exceeding 650 FPM are contemplated), 0.45 g linear acceleration/deceleration rate, and that carton 1 is preceded by the correct gap, requiring no adjustments for carton 1.

Figure 8:
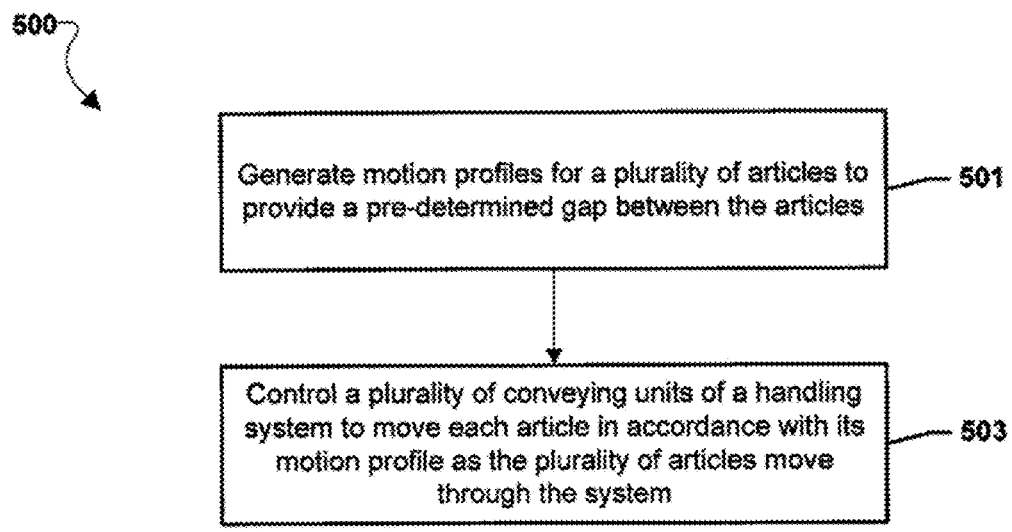
FIG. 8 illustrates a process flow diagram illustrating an embodiment method of operating a material handling system to provide gap control.
Figure 10:
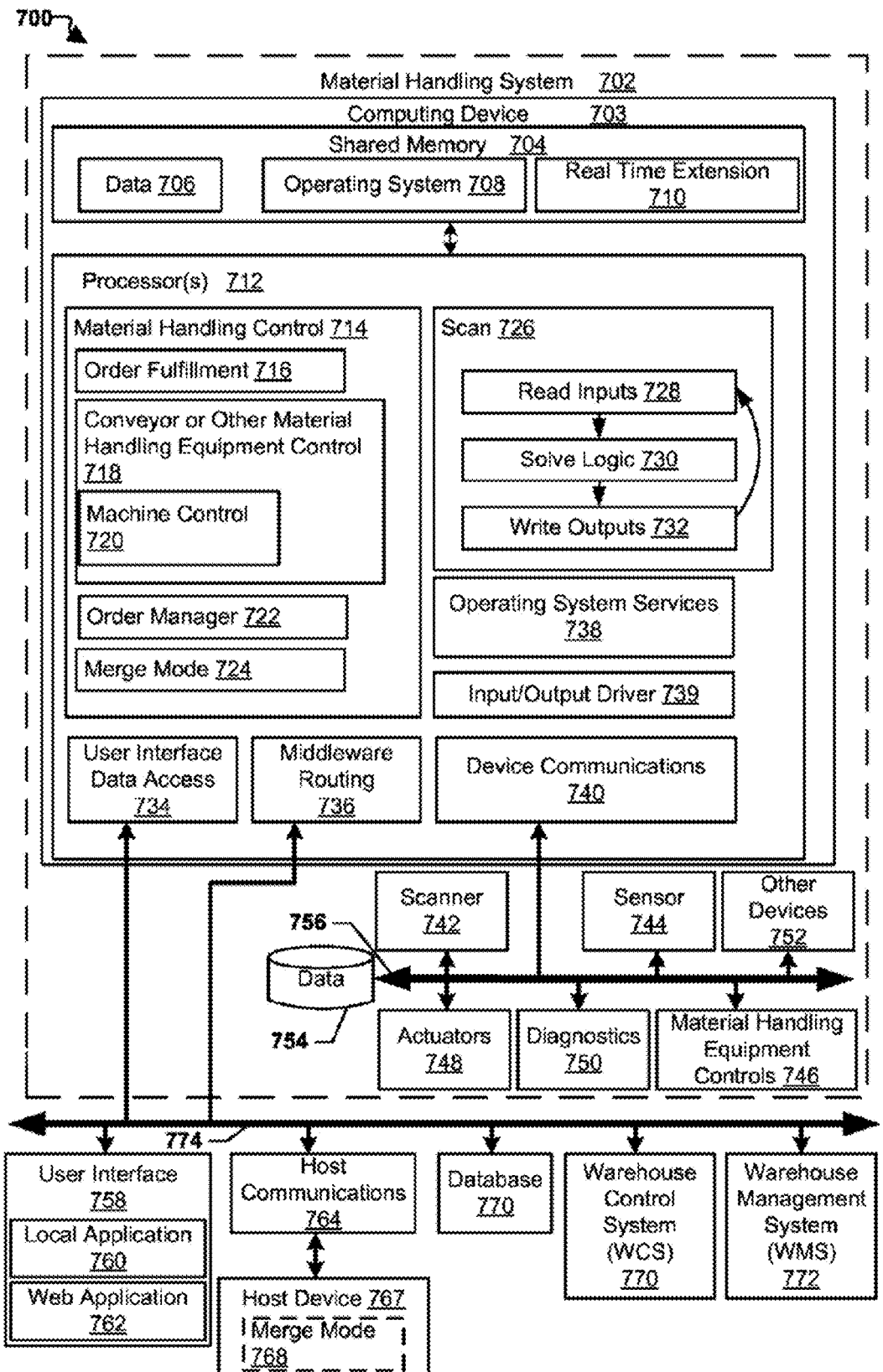
FIG. 10 illustrates an exemplary processing architecture of a material handling system suitable for use with the various embodiments.

FIG. 8 is a process flow diagram that illustrates an embodiment method 500 for operating a material handling system including a plurality conveying units. The method 500 may be implemented in a system such as shown in FIG. 7 which may be controlled by a system controller having a processing architecture as shown in FIG. 10. In block 501, motion profiles for a plurality of articles may be generated to provide a pre-determined gap between the articles. The articles may be cartons, for example, which may enter the system having a first spacing (gap) between each article. The first gaps may be known and/or determined (e.g., detected) by the system. The motion profiles may be generated so as to provide a pre-determined second spacing (gap) between each article when the articles exit the system.

In block 503, a plurality of conveying units of the handling system may be controlled to move each article in accordance with its motion profile as the plurality of articles move through the system. The conveying units may include, for example, a series of rollers (or groups of rollers), short belt conveyors, short strip belt conveyors, or another conveying mechanism that may be controlled independently of the other conveying units in the system. The conveying unit may be controlled so that each article that is moved by the conveying unit is moved in accordance with the generated motion profile for that article. In embodiments, the conveying unit may be controlled so as to move the article with a velocity and/or an acceleration that is based on the motion profile for that article. After the article is moved off of the unit (i.e., is transitioned to a subsequent conveying unit), the conveying unit may be controlled so as to move the next article in the flow of articles with a velocity and/or an acceleration that is based on the motion profile for that next article. Thus, the series of conveying units may be controlled to concurrently implement the plurality of motion profiles for each of the articles. Upon exiting the series of conveying units, the plurality of articles may have the pre-determined gap between the articles.

Various embodiments may include a gapping system and method that can handle a stream of articles (e.g., cartons) at high velocity (e.g., >500 feet per minute, such as 600 feet per minute or more, such as 600-800 feet per minute). The system may include a brake/meter belt at the entrance to separate touching articles (e.g., cartons). The system may include a relatively large distance between an article detector (e.g., visual, photo eye) and a first transition point (e.g., end of a first belt) to collect enough article and gap information to enable appropriate planning, which article to move forward, which to move back, which to leave as is, etc.

An alternative to the use of multiple conveying unit controls is to treat each as a separate system that delivers with no speed difference, possibly as a fixed speed separating conveying unit. This has limits on how much can be accomplished per conveying unit, and results in numerous separate systems.

Figure 9A:
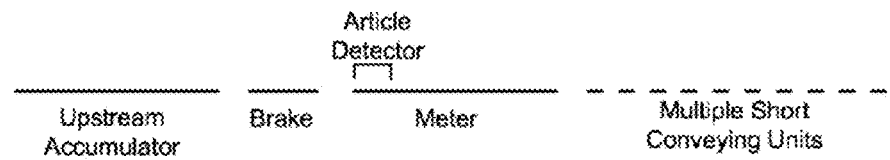
FIGS. 9A-9N illustrate exemplary implementations of a gapping method and system.

Another alternative is to have relatively short conveying units, including conveying units that do not affect more than one article. With this situation, each article may receive independent control across all of the conveying units. A single profile for each article may be generated across multiple conveying units, rather than separate profiles for each transition. The result is schematically illustrated in FIG. 9A.

In this embodiment, the brake/metering section need not be variable speed, and may comprise, for example, more short stages. The length of the short conveying units may be short enough so that they typically affect only one article at a time. In some embodiments, the length of each conveying unit may be no longer than the length of the shortest article to be moved through the system. In embodiments, the conveying units may be shorter than length of the shortest article to allow for acceleration/deceleration between articles.

Figure 9B:
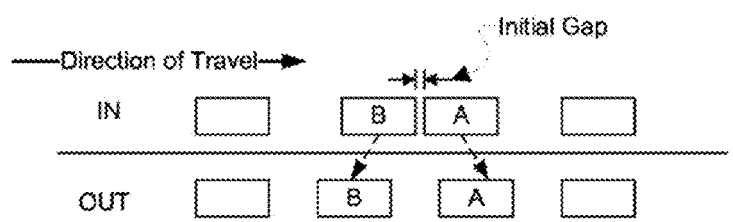
Figure 9C:
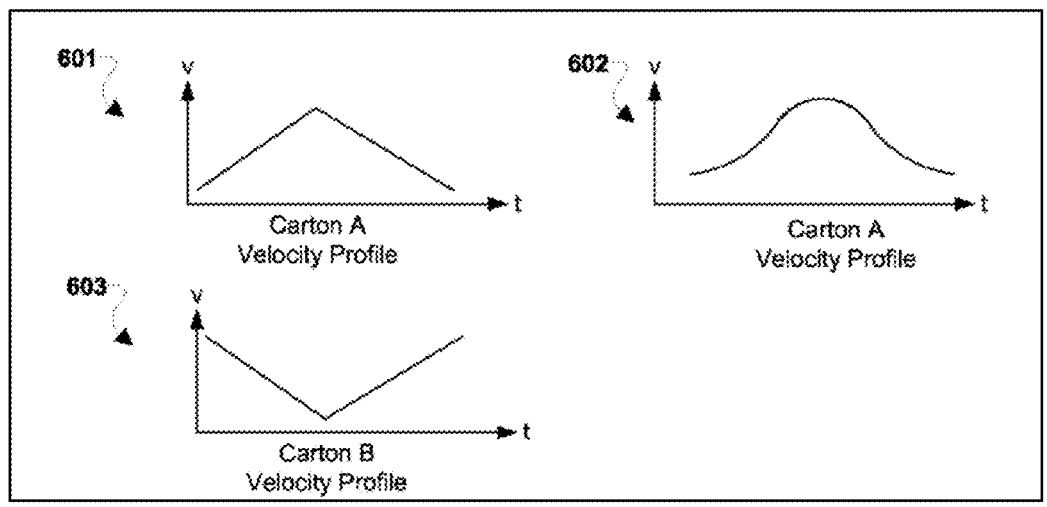

On the premise that the meter belt is fixed speed, for example, consider two cartons too close together in between two other cartons, and the correction is to move the leading carton A forward and the trailing carton B backwards. This is illustrated in FIG. 9B. Presume no action is taken on the carton until it is completely on the short conveying units (e.g., short belts). The motion profile, in this case a velocity profile, for carton A may be a ramp up followed by a ramp down. In various embodiments, the velocity profiles may be a linear velocity profiles, non-linear velocity profiles, or combinations of linear and non-linear velocities, and may describe the planned velocity of the article over time. Example velocity profiles 601 and 602 for carton A are shown in FIG. 9C. While velocity profiles are illustrated in FIG. 9C, acceleration profiles may be used instead of, or in addition to, velocity profiles to control the conveying units. Acceleration profiles may describe acceleration and/or deceleration of an article over time, and may be linear, non-linear, constant, or combinations of linear, non-linear, and/or constant accelerations/decelerations over time.

Figure 9D:
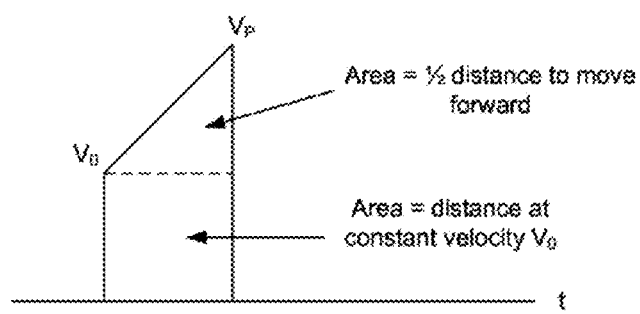

Profile of Carton A may begin as soon as A enters the multi-conveying unit portion of the system, such as when carton A is no longer under control of the meter belts and enters the multi-conveying unit portion of the system. The velocity may ramp up from an initial velocity ($V_0$) to a peak velocity ($V_P$) over a period of time (t) that produces one-half of the distance (d) that carton A must move forward assuming a constant acceleration rate (a). Once the velocity reaches the peak velocity ($V_P$) then the velocity may ramp back down. The increase to reach the peak velocity ($V_P$) from the initial velocity ($V_0$) (e.g., the velocity of meter belt feeding the multi-conveying unit portion of the system) is shown graphically in FIG. 9D.

Similarly, carton B's profile may be triangular (or alternatively curved) and may not begin until B is no longer under control of the meter belt and enters the multi-conveying unit portion of the system. Of interest is the velocity and time at each position along the way. The velocity and position of each article may be determined at each position or point. The acceleration rate of the belt between the articles may be calculated by $\Delta v/\Delta t$. As used herein, "between" the articles means what the belt must do after a first article (e.g., carton A) has left in preparation for the next article (e.g., carton B). The velocity profile 603 of carton B is illustrated in FIG. 9C. As illustrated by the initial deceleration of the velocity profile 903 and the initial acceleration of the velocity profile 601, the system is trying to move carton B "backwards" relative to carton A by speeding up carton A and slowing down carton B, thereby increasing the gap between carton A and carton B.

Calculations for velocity and time of an article at each position along the path while the article is accelerating may be made based on the relationships between position (or distance) of the article at a given time (t) (i.e., Pt), the acceleration rate (a), the initial velocity (V0), and the velocity at the given time ($V_t$). For example, for any position (Pt) during the acceleration, the time (t) may be determined according to the equation:

$$t = \frac{\sqrt{v_0^2 + 2aP_t} - v_0}{a}. \qquad \text{Eqn. 1}$$

Once time (t) is calculated, the velocity at the given time ($V_t$) may be calculated according to the equation:

$$v_t = v_0 + at \qquad \text{Eqn. 2.}$$

Similarly, calculations of velocity and time of an article at each position along the path while the article is decelerating may be made based on the relationships between position (or distance) of the article at a given time (t) (i.e., $P_t$), the acceleration rate (a) (i.e., a negative value during deceleration of the article), the initial velocity ($V_0$), and the velocity at the given time ($V_t$). For example, for any position $P_t$ during the deceleration, time (t) may be determined according to the equation.

$$t = \frac{v_0 - \sqrt{v_0^2 + 2aP_t}}{a}. \qquad \text{Eqn. 3}$$

Once time (t) is calculated, the velocity at the given time ($V_t$) may be calculated according to the equation:

$$v_t = v_0 - at \qquad \text{Eqn. 4.}$$

In one embodiment, a data structure (e.g., an array or table, such as a spreadsheet) may be developed that includes the velocity and time for each point and may include the calculated acceleration required of the conveying units between articles.

In embodiments, when the article leaves the metering belt, which may be fixed speed, the conveying units (e.g., short belts) of the multi-conveying unit portion may be at the same speed.

In embodiments, the gapping system may include at least two software modules, a velocity profile planner and a velocity profile controller. The velocity profile planner may calculate a velocity profile for an article. The velocity profile controller may implement the calculated velocity profile by controlling the various conveying units according to the velocity profile.

Figure 9E:
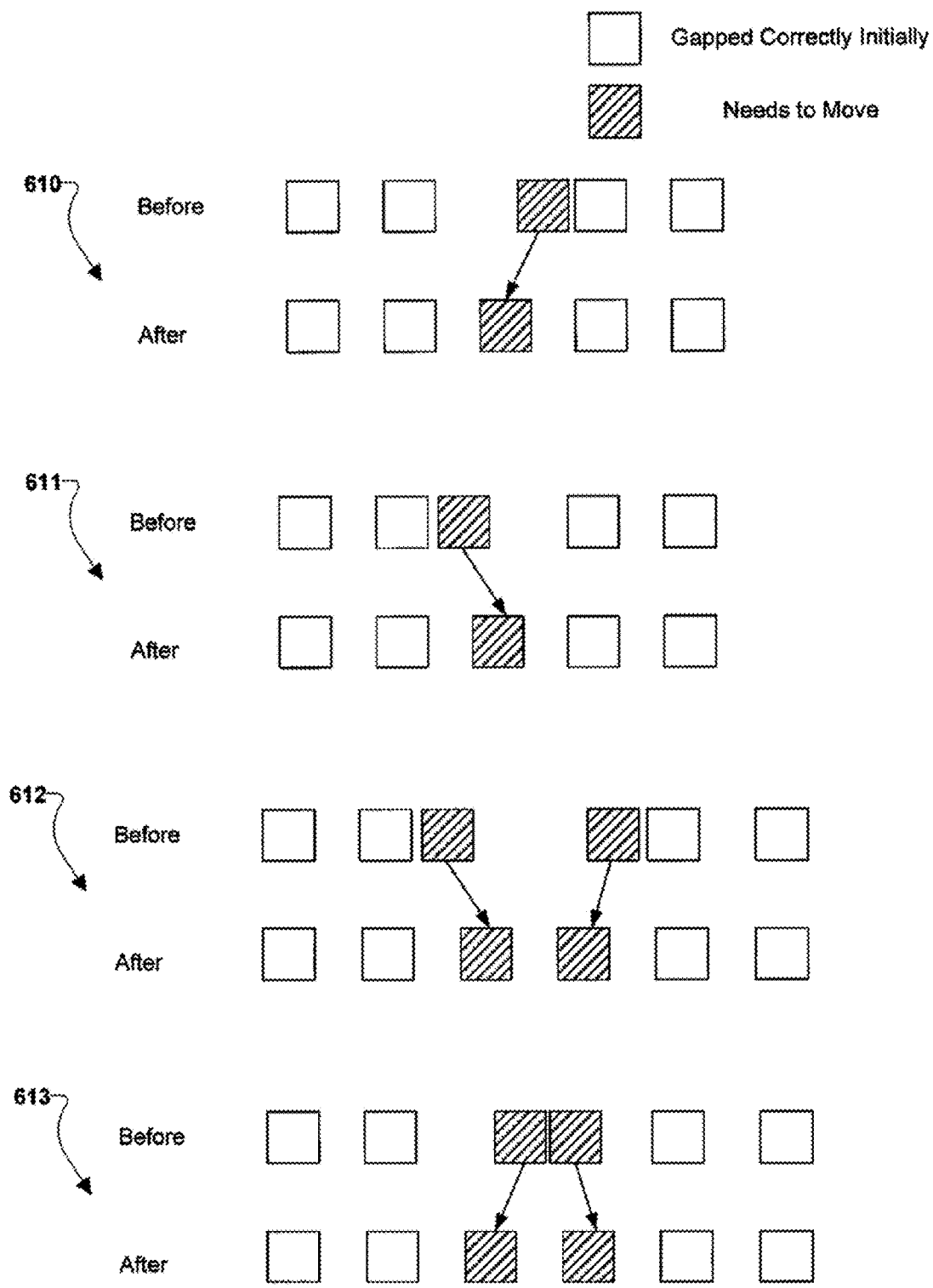

FIG. 9E schematically illustrates a series of cartons 610, 611, 612, and 613 which are flowing into the gapping system ("Before") and the same cartons having the desired gap spacing ("After"). The ideal is to have the white cartons in FIG. 9E pass through the gapping system without speed up or slow down, because their gaps are fine. The shaded cartons need a velocity profile that moves them forward or backward relative to the other cartons.

Figure 9F:
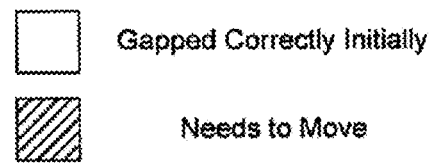
Figure 9F:
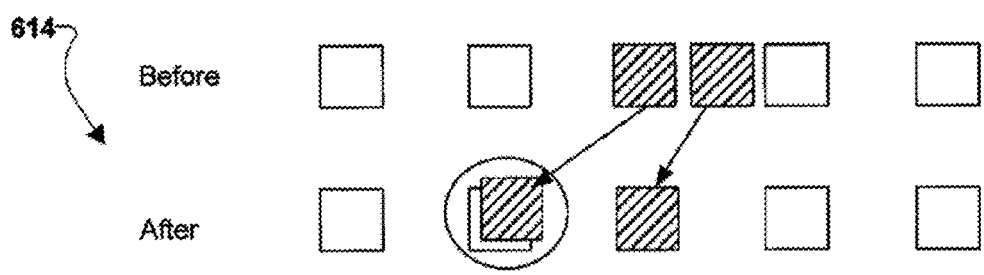
Figure 9F:
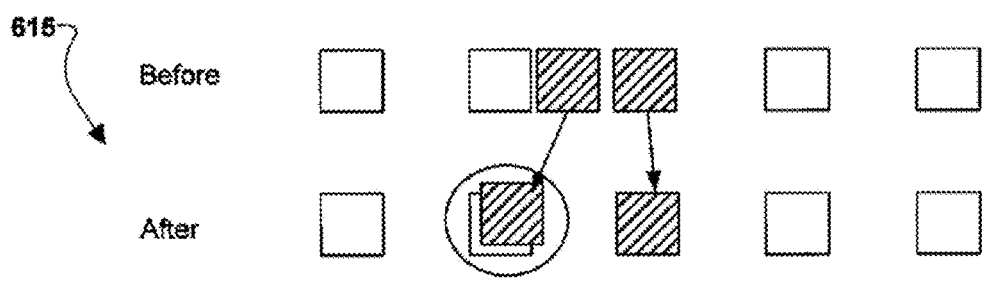

As illustrated in FIG. 9F, though not moving cartons with the desired gap may be ideal, the movement of a carton in series of cartons 614 or 615 may cause the carton to impact another carton, such as a carton that was initially correctly gapped. When such an event occurs, more than the initially incorrectly gapped cartons may be affected and may need to be moved.

Figure 9G:
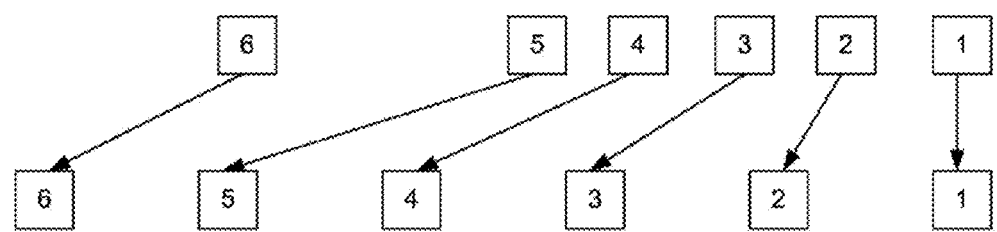

At some point, due to preceding carton positions, etc., there will be a situation as shown in FIG. 9G, where carton 1 passes through unaffected, carton 2 moves backward a little, carton 3 moves backward more than carton 2, carton 4 moves backward even more than carton 3, and carton 5 moves backward more than carton 4. Carton 6 has a proper gap, but must still be affected due to carton 5's profile.

The angle of the arrows in FIG. 9G represents the acceleration upon the carton. For example, carton 5 has a more severe correction than carton 2. There may be a maximum acceleration that the carton and conveying unit (e.g., belt) may handle without causing rocking due to jerk (e.g., about 0.45 g for a triangular velocity profile, which may be increased with a curved velocity profile).

There are at least two ways of implementing the profiles for each article. In one method (METHOD A), the same acceleration (e.g., the maximum acceleration, or an acceleration close to the maximum acceleration) is used for all articles. The other method (METHOD B) includes using a portion of the length of the gapping system to fit the profile(s), such as the entire length of the gapping system or a length less than the entire length of the gapping system.

Figure 9H:
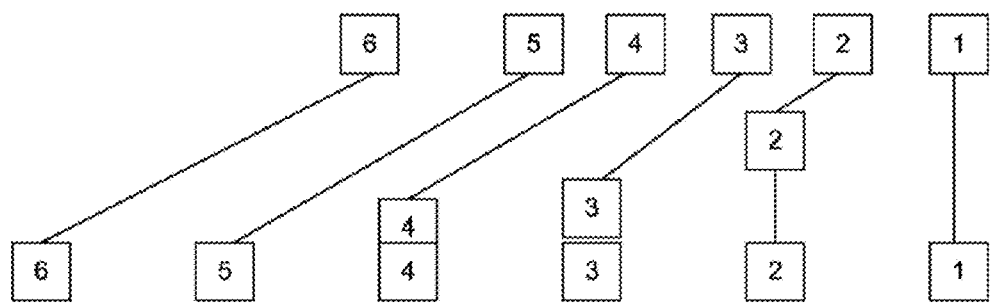

If the first method (METHOD A) is used, then FIG. 9G becomes as shown in FIG. 9H. The planning algorithm must include the knowledge of how much correction the previous carton was attempting, and this must be added to the next carton. For instance, if carton 1 had no correction, carton 2 need only correct (move backward) for the required gap between cartons 1 and 2. Carton 3 needs to correct (move backward) for the required gap between cartons 2 and 3 plus the correction implemented by carton 2.

If using the first method, the profiles may be shorter than the length of the gapping system, and thus the profiles may be started and/or ended at various points along the length of the system. In one embodiment, the profiles for moving articles backward may be started at the entrance to the gapping system and profiles for moving articles forward may end at the exit of the gapping system. In another embodiment, the profiles for moving articles forward may be started at the entrance to the gapping system and profiles for moving articles backward may end at the exit of the gapping system. The reason for this is that this may minimize overlapping of the profiles.

In embodiments, each article has its own profile, and all profiles for the articles on the conveying units may be implemented simultaneously. The nose (leading end) of each article may be tracked, and knowing the length of each article, it may be determined which conveying units (e.g., belts) to control for a given article.

Figure 9I:
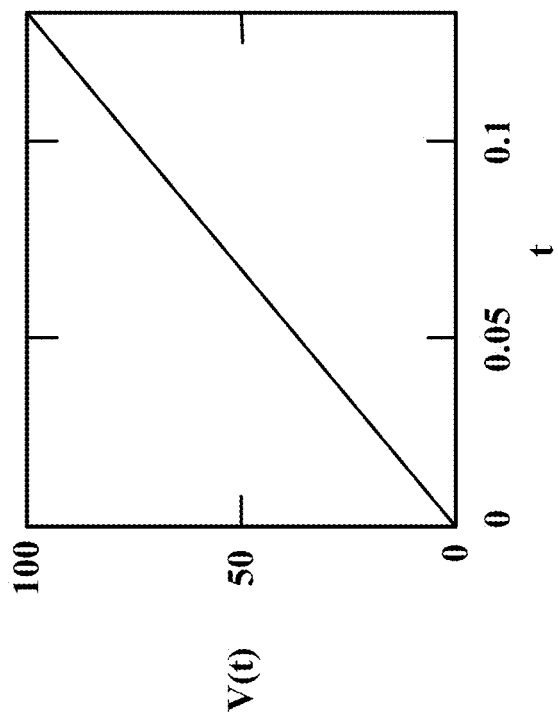
Figure 9I:
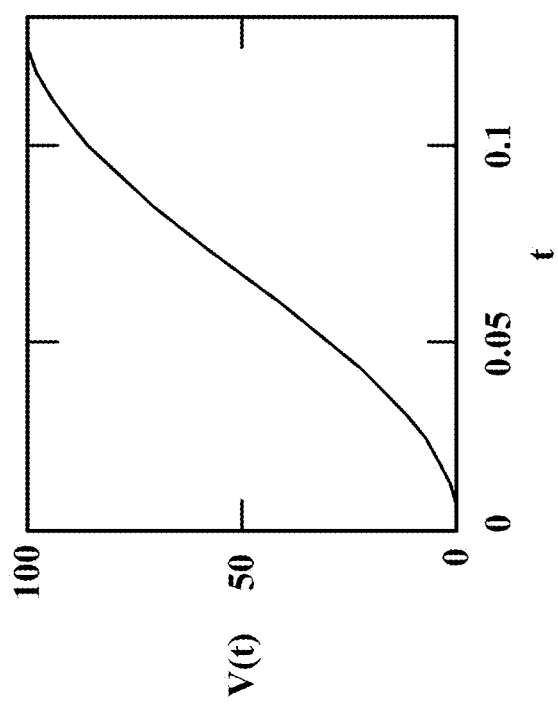
Figure 9J:
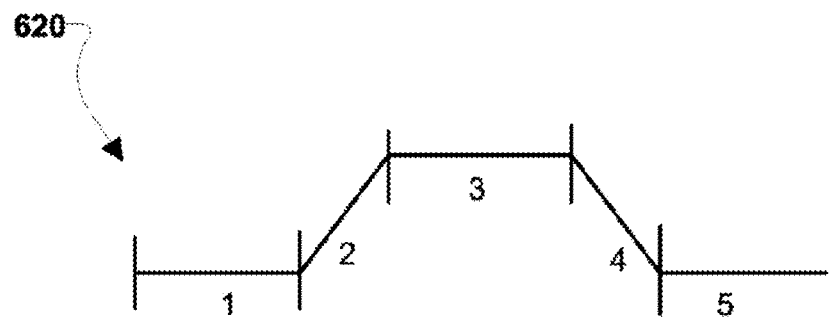
Figure 9J:
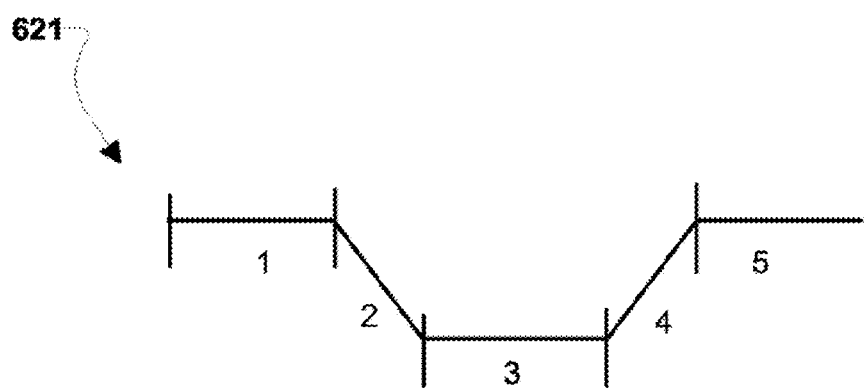
Figure 9K:
Figure 9K:

In one embodiment, a sinusoidal velocity profile may be used, and for a given time (T), the peak acceleration of the sinusoidal velocity profile occurs at T/2 and produces an acceleration of π/2 times the linear acceleration. The equation for the sinusoidal velocity profile may be the equation of the curve Y(t) illustrated in FIG. 9I. Any limit on the peak acceleration may be determined experimentally, based on the particular system. Given a required gap between articles to create, a maximum FPM may be calculated, and a profile that starts at zero (e.g., the end of the meter belt) can be calculated. For calculation purposes, the linear velocity profile may be used, as shown in FIG. 9I. An exemplary embodiment velocity profile 620 for accelerating an article and a velocity profile 621 for decelerating an article are shown in FIG. 9J. During acceleration of an article, in the first portion of the velocity profile 620 the gapping system may maintain a normal velocity, such as the velocity of the metering belt, for a time 1 to allow enough length of the item, such as the entire length of the item, to reach the conveyor unit. In time 2, the conveyor unit may accelerate to ramp up the velocity, in time 3 the velocity may be constant, and in time 4 the conveyor unit may decelerate to ramp the velocity down back to the normal velocity, for a time 5. During deceleration of an article, in the first portion of the velocity profile 621 the gapping system may maintain a normal velocity, such as the velocity of the metering belt, for a time 1 to allow enough length of the item, such as the entire length of the item, to reach the conveyor unit. In time 2, the conveyor unit may decelerate to ramp down the velocity, in time 3 the velocity may be constant at some minimum velocity, such as zero, 100 feet per minute, or any other minimum velocity, and in time 4 the conveyor unit may accelerate to ramp the velocity up back to the normal velocity, for a time 5. In this manner, the gaps may be increased or decreased by slowing down or speeding up articles. For example, as illustrated in FIG. 9K, the initial gap G may be increased by a distance K by slowing down carton 2 for a length of time, such that it takes K/normal velocity ($V_{NOM}$) more seconds for carton 2 to reach the end than cartons 1 or 3.

The maximum slowdown velocity is from nominal to zero, although a minimum velocity may be imposed to account for the physics of the drive. A certain linear velocity profile may be planned and a sinusoidal velocity profile of equivalent time may be implemented.

Figure 9L:
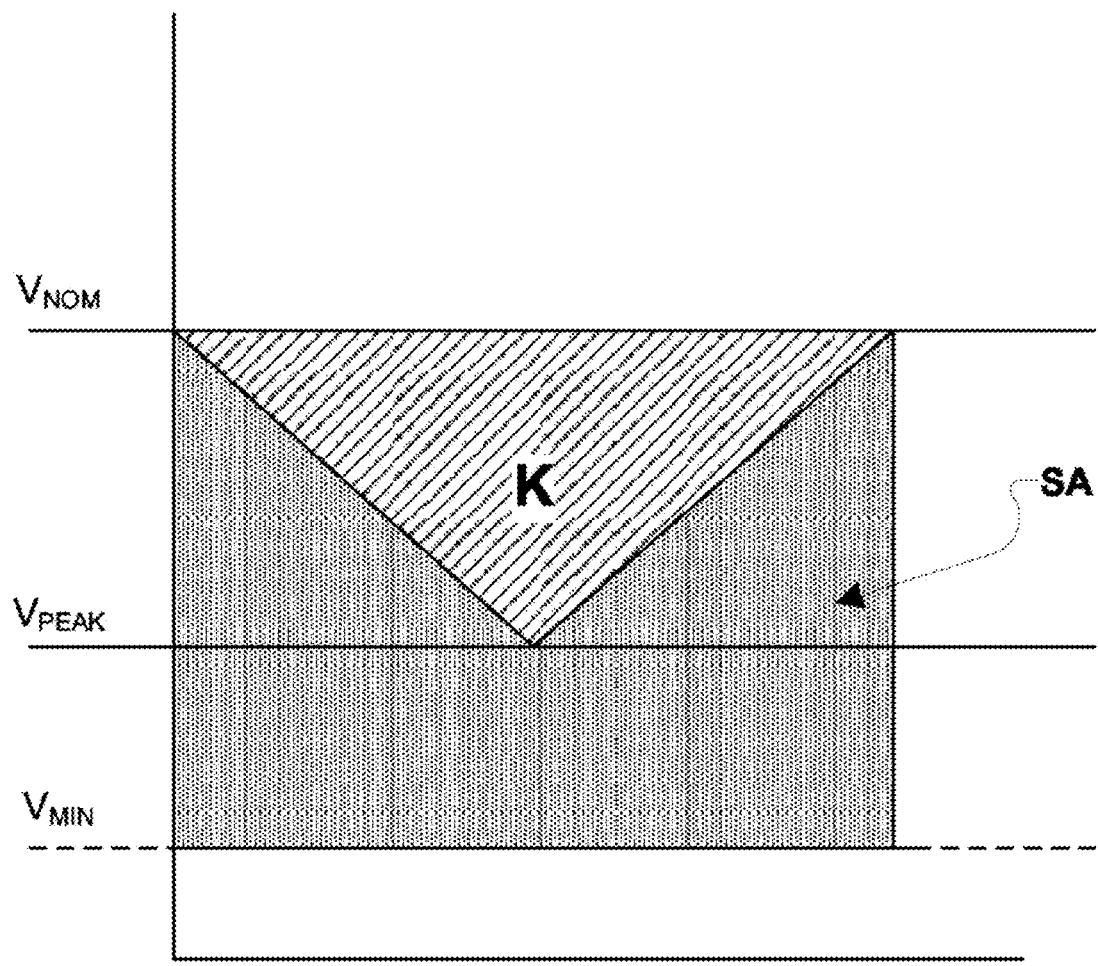

Another way to calculate the slowdown is that the stripe shaded area is "lost" distance and the lost distance must equal K, as shown in FIG. 9L. The shaded area "SA" shown in FIG. 9L may be based on the length of the conveyor units and may be defined by the equation:

$$SA = 2 * \frac{V_{nom} + V_{min}}{2} * \frac{V_{nom} - V_{min}}{a}. \qquad \text{Eqn. 5}$$

Where a is the acceleration, $V_{NOM}$ is the normal velocity, and $V_{MIN}$ is the minimum velocity.

In the various embodiments, the conveyor units may begin acceleration once a portion of the article to be controlled is on the belt, such as when the entire article is on the belt.

Figure 9M:
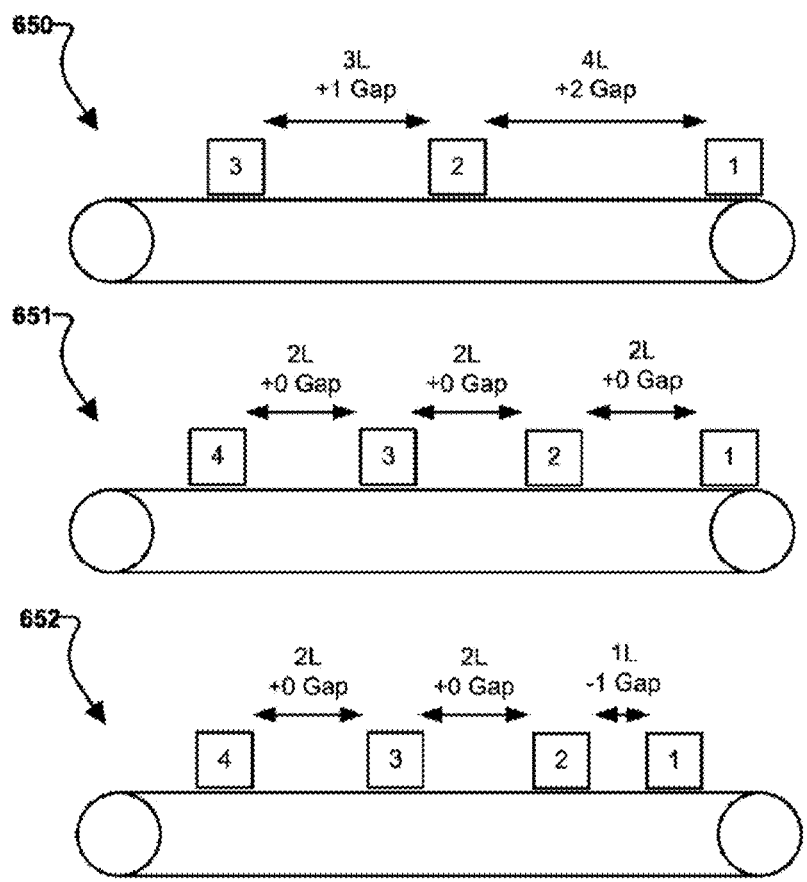

If the lead article has gap in front of the article (i.e., there is empty space downstream of the lead article), then the gapping system may determine whether to move the lead article ahead to create a gap bank (or gap excess), and if so, by how much. One solution is to place an arbitrary limit on the closing down of gaps and let the gapping system always shift articles forward. But this would include making an adjustment when no adjustment is needed. Since the gapping system may wait until the lead article is about to exit the meter belt before deciding what to do, in various embodiments the gapping system may determine what gaps are needed (if any) to meet a minimum gap bank (or gap excess requirement) and may move the lead article forward accordingly. Example gap bank scenarios 650, 651, and 652 are illustrated in FIG. 9M. In the example scenarios 650, 651, and 652, a desired gap of two carton lengths (2L) may be set for the gapping system and the gapping system may set a gap bank requirement at one carton length (+1 Gap). In scenario 650, the gap between carton 1 and carton 2 may be four carton lengths (4L) and the gap between carton 2 and carton 3 may be three carton lengths (3L). The excess gap may be +3 Gap, which may be higher than the gap bank requirement. Thus, the gapping system may not move carton 1 forward. In scenario 651, the gaps between the cartons 1, 2, 3, and 4 may all be two carton lengths (2L), and there may be no excess gap because cartons 1, 2, 3, and 4 are at the desired gap. Thus, the gapping system may move carton 1 forward 1 carton length (1L) to produce an excess gap of +1 Gap and meet the gap bank requirements. In scenario 652, carton 1 may be only 1 carton length (1L) from carton 2, and cartons 2, 3, and 4 may be properly gapped as desired. Thus, there may be negative excess gap (−1 Gap), and the gapping system may move carton 1 forward two carton lengths (2L) to create one excess gap (+1 Gap) to meet the gap bank requirement. In this manner, the gapping system may move the first carton forward as needed to always keep a certain amount in a "gap bank" which may provide room to move upstream cartons forward to adjust gaps as needed. Looking at upcoming gap requirements may require a longer meter belt.

Figure 9N:
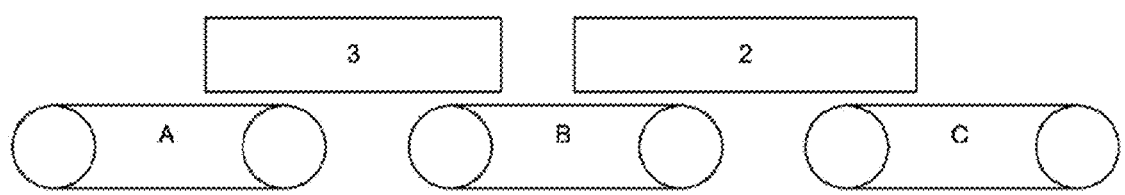

In embodiments, the conveying units (e.g., belts) may be shorter than the length of the articles. Thus, it may be possible for one conveying unit B to have parts of two cartons 3 and 2 on it as shown in FIG. 9N. There are various ways to determine which carton (i.e., which carton's profile) controls the speed of the conveying unit B. In various embodiments, the system may include rules for governing control of the conveying unit based on various factors. For example, carton 2 may control the speed because it is downstream. As another example, carton 3 may control the speed because it is shorter. As a further example, carton 2 may control the speed because it is longer. In one or more embodiments, the profile of the article that is most affected by a given conveying unit may control the operation of the belt. The determination of the article most affected by a conveying unit may be determined based on the relative proportions in contact with the conveying unit and/or the gap between the articles. In an embodiment, the determination may be based on a comparison of the portion in contact with the conveying unit versus a length of the article. The length of the gap between the articles may also be taken into account. For example, for each carton the following may be calculated: (level of contact+gap)/length of carton. Whichever carton has the large value may control the conveying unit.

In embodiments, the speed of an empty conveying unit (e.g., a belt) may be the last commanded speed of that conveying unit until something (i.e., an upcoming article) changes it. The speeds of downstream conveying units may be adjusted in advance of an upcoming article. In embodiments, empty conveying units may accelerate at a particular rate ($a_m$), for example a 2 g rate. So, the system may be configured to look ahead by a particular distance and adjust downstream conveying units. The system may look ahead by a distance (dist) that is no further than it takes to go from the current velocity ($V_c$) to zero. When the system determines a conveying unit is empty, the system may determine the speed of the next downstream conveying unit ($V_B$). If the speed on the downstream conveying unit ($V_B$) is less than the current velocity ($V_c$), the system may determine an adjusted velocity ($V_A$) for the empty conveying unit according to the equation:

$$V_A = V_C - a_m \frac{dist}{V_C}. \qquad \text{Eqn. 6}$$

If the adjusted velocity ($V_A$) is greater than the speed of the downstream conveying unit ($V_B$), the empty conveying unit speed may be set to the adjusted velocity ($V_A$). If the adjusted velocity ($V_A$) is less than the speed of the downstream conveying unit ($V_B$), the empty conveying unit speed may be set to the speed on the downstream conveying unit ($V_B$). Alternatively, if the speed of the downstream conveying unit ($V_B$) is greater than the current velocity ($V_c$), the system may determine an adjusted velocity ($V_A$) for the empty conveying unit according to the equation:

$$V_A = V_C - a_m \frac{dist}{V_C}. \qquad \text{Eqn. 7}$$

If the adjusted velocity ($V_A$) is less than the speed of the downstream conveying unit ($V_B$), the empty conveying unit speed may be set to the adjusted velocity ($V_A$). If the adjusted velocity ($V_A$) is greater than the speed on the downstream conveying unit ($V_B$), the empty conveying unit speed may be set to the speed of the downstream conveying unit ($V_B$).

To prevent a look ahead from affecting an existing article, the profile may need to be extended to include the exit of the full article length, and not just the nose. The preceding discussion may work for most conveying units (e.g., belts), but generally not for the first belt, because it needs to give up control of an article if the next article is coming. A check may be performed if an article owns the first belt with its tail portion to determine whether something is about to exit the meter belt.

FIG. 10 illustrates an exemplary processing architecture 700 of a material handling system 702 suitable for use with the various embodiments. The processing architecture 700 may be implemented in hardware, software, or combinations of hardware and software in one computing device or across a series of computing devices in communication with each other as needed to perform the functionality described herein.

The material handling system 702 may include a computing device 703 including a processor readable shared memory 704 connected to one or more processors 712. The one or more processors may function as controllers for the material handling system 702. For example, one processor may be a primary controller while another may serve as a backup controller that may be swapped for the primary controller automatically or by maintenance personnel in the event of a failure without undue service downtime. The shared memory 704 may include an operating system (e.g., Windows, Linux, etc.) and real time extension 710.

The one or more processors 712 may execute various logical layers, applications, or modules including a material handling controls 714, scans 726, user interface data access 734, middleware routing 736, device communications 740, operating system services 738, and input/output drivers 739. The various logical layers, applications, or modules including material handling controls 714, scans 726, user interface data access 734, middleware routing 736, device communications 740, operating system services 738, and/or input/output drivers 739 may be executed in conjunction with one another and exchange data with one another. As the one or more processors receive inputs (e.g., signals from switches, photo eyes, etc., data messages, or other various input types) the various logical layers, applications, or modules including material handling controls 714, scans 726, user interface data access 734, middleware routing 736, device communications 740, operating system services 738, and/or input/output drivers 739 may be executed individually and/or in concert by the one or more processors 712 to generate outputs (e.g., electrical signals to motor contacts, solenoid valves, switches, lamps, etc., data messages, or other output types).

Scans 726 may be repeatedly executed by the one or more processors 712 and may include a read inputs module 728, a solve logic module 730, and a write outputs module 732. By executing the various logical operations of the modules 728, 730, and 732 on a regular period basis the scans 726 may be counted to measure time. The solve logic module 730 may incorporate any type of logic, including "if-then-else" branching logic, motion control logic, simple logic, sophisticated logic, hard lined logic, configured logic, etc. Data used by the solve logic module 730 may reside in the shared memory 704, such as data 706, or a local, remote, or cloud-based data storage device, such as data store 754. Scans 726 may be performed at different intervals, for example scans for motion control may occur every 1 millisecond to 2 milliseconds, scans for merge subsystems may occur every 5 milliseconds, and general conveyor scans may occur every 25 milliseconds.

Material handling controls 714 may include order fulfillment module 716, conveyor or other material handling equipment control module 718 including a machine control module 720 to generate instructions for conveyors and/or other material handling equipment, order manager module 722, and merge mode application or module 724 to monitor conditions and adjust merge modes for conveyors within a material handling system (e.g., a distribution center).

The one or more processor 712 may exchange data with scanners 742, sensors 744, actuators 748, diagnostic systems 750, material handling equipment controls 746 (such as conveyor controls), data store 754, and other devices 752 (e.g., scales, printers, etc.) via network connections 756 (e.g., TCP/IP connections, Ethernet connections, Ethercat connections, PROFIBUS connections, RS 232 connections, USB connections, Wi-Fi connections, cellular connections, etc.).

The processing architecture 700 may include other systems interfacing with the material handling system 702 via network connections 774 (e.g., TCP/IP connections, Ethernet connections, Ethercat connections, PROFIBUS connections, RS 232 connections, USB connections, Wi-Fi connections, cellular connections, etc.), such as user interface devices 758 (e.g., a display, user terminal, etc.) displaying a local application 760 or web application 762, host communication devices 764 enabling communication with a host device 767 (e.g., via FTP, TCP/IP, etc.), a database 770, a warehouse control system (WCS) 770, and/or a warehouse management system (WMS) 772. A host device may also include a merge mode module or application 768 which may transmit information related to the merging operations of containers to the one or more processors 712 of the material handling system 702.

Figure 11:
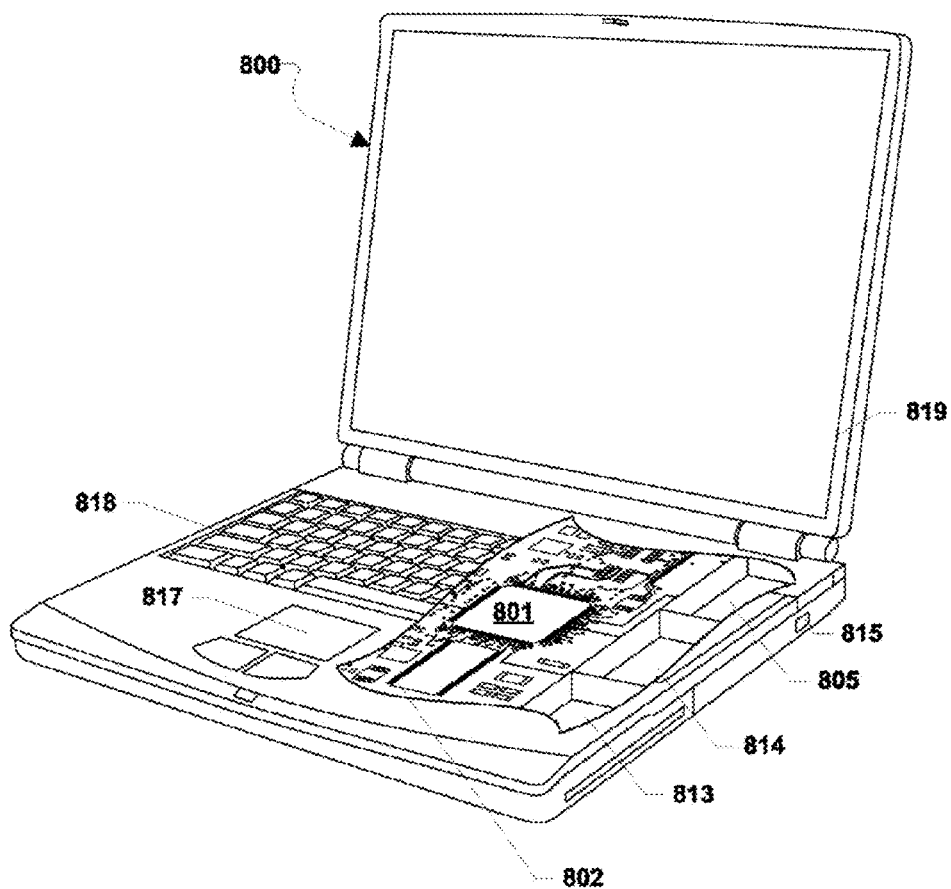
FIG. 11 illustrates a component block diagram of an example laptop computing device suitable for use with the various embodiments.

The various embodiments may be implemented in any of a variety of computing devices, an example of which is illustrated in FIG. 11. A computing device 800 will typically include a processor 801 coupled to volatile memory 802 and a large capacity nonvolatile memory, such as a disk drive 805 of Flash memory. The computing device 800 may also include a floppy disc drive 813 and a compact disc (CD) drive 814 coupled to the processor 801. The computing device 800 may also include a number of connector ports 815 coupled to the processor 801 for establishing data connections or receiving external memory devices, such as a USB or FireWire™ connector sockets, or other network connection circuits for establishing network interface connections from the processor 801 to a network or bus, such as a local area network coupled to other computers and servers, the Internet, the public switched telephone network, and/or a cellular data network. The computing device 800 may also include the trackball or touch pad 817, keyboard 818, and display 819 all coupled to the processor 801.

Figure 12:
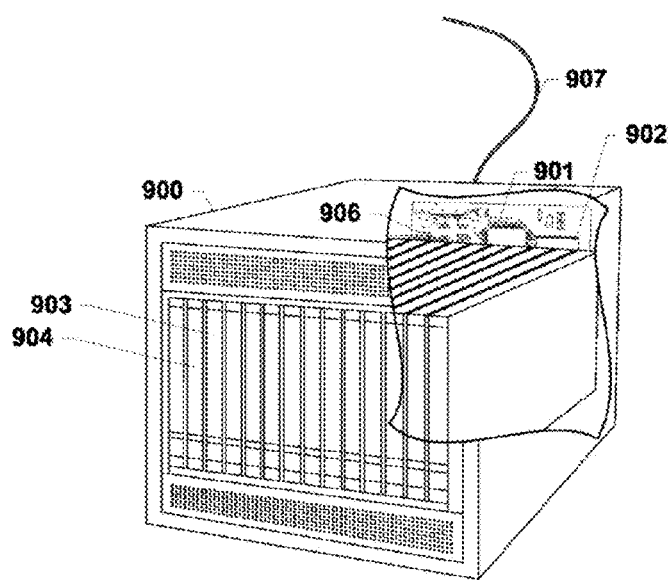
FIG. 12 illustrates a component block diagram of a server computing device suitable for use in an embodiment.

The various embodiments may also be implemented on any of a variety of commercially available server devices, such as the server 900 illustrated in FIG. 12. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing network interface connections with a network 907, such as a local area network coupled to other computers and servers, the Internet, the public switched telephone network, and/or a cellular data network.

The processors 801 and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 802, 805, 902, and 903 before they are accessed and loaded into the processors 801 and 901. The processors 801 and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801 and 901 including internal memory or removable memory plugged into the device and memory within the processor 801 and 901 themselves.

By virtue of the foregoing, a method is provided for operating a material handling system including a plurality of conveying units. Method includes generating, by a computing device, motion profiles for a plurality of articles to provide a pre-determined gap between the articles. The method includes controlling, by the computing device, the plurality of conveying units to move each article in accordance with its motion profile as the plurality of articles move through the material handling system.

In one or more embodiments, the motion profiles are generated based on at least one known first gap between the articles as the articles enter the system, and the pre-determined gap is different than the first gap. In one or more embodiments, the plurality of conveying units are independently controllable. In a particular embodiment, each conveying unit is controlled so as to move a first article located on the conveying unit with at least one of a first velocity and a first acceleration that is based on the motion profile associated with the first article. Alternatively or in addition, each conveying unit is controlled so as to move a second article located on the conveying unit subsequent to the first article with at least one of a second velocity and a second acceleration that is based on the motion profile associated with the second article.

In one or more embodiments, the plurality of conveying units are controlled to concurrently implement the plurality of motion profiles for each of the plurality of articles. In one or more embodiments, the plurality of conveying units are controlled such that the plurality of articles have the pre-determined gap between the articles when the articles exit the plurality of conveying units. In one or more embodiments, the conveying units comprise at least one of a roller, a short belt conveyor, and a short strip belt conveyor. In a particular embodiment, the articles comprise cartons.

In one aspect of the present disclosure, method is provided for operating a material handling system including a plurality of independently controllable conveying units. In one or more embodiments, the method includes generating, by a computing device, motion profiles for a plurality of articles based on at least one known first gap between the articles as the articles enter the material handling system to provide a pre-determined gap between the articles that is different than the first gap. The method includes calculating a position of a selected article on a selected one of the conveying units based upon the associated motion profile. The method includes controlling, by the computing device, the plurality of conveying units at a respective time based upon the calculated position to move each article in accordance with its motion profile as the plurality of articles move through the material handling system. Each conveying unit is controlled so as to (i) move a first article located on the conveying unit with at least one of a first velocity and a first acceleration that is based on the motion profile associated with the first article, and (ii) to move a second article located on the conveying unit subsequent to the first article with at least one of a second velocity and a second acceleration that is based on the motion profile associated with the second article. The plurality of conveying units are controlled such that the plurality of articles have the pre-determined gap between the articles when the articles exit the plurality of conveying units. The plurality of conveying units are controlled to concurrently implement the plurality of motion profiles for each of the plurality of articles by adding an amount of correction provided by an overlap in the respective motion profiles associated with a selected article and an adjacent downstream article. The plurality of conveying units are controlled by (i) determining based on the respective motion profiles that an upstream article and an adjacent downstream article will both have a least a portion of their respective length on a selected conveying unit, and (ii) determining which of the upstream and downstream articles have a larger relative proportion of contact area with the selected conveying unit; and (iii) selecting one of the respective motion profiles for controlling the selected conveying unit based upon the determined larger relative portion of contact area. In one or more embodiments, the motion profile comprises a triangular velocity profile. In one or more embodiments, the motion profile comprises a curved, sinusoidal velocity profile.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of desktop computers, personal data assistants (PDA's), laptop computers, tablet computers, smart books, palm-top computers, personal computers, and similar electronic devices equipped with at least a processor configured to perform the various operations described herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

In one or more embodiments, the method includes determining that a selected conveying unit is empty. In response to determining that the selected conveying unit is empty, the method includes determining an adjusted velocity of an adjacent upstream conveying unit according to a motion profile associated with an upstream article when positioned to transition onto the selected conveying unit. The method includes adjusting a velocity of the selected conveying unit to reach the adjusted velocity prior to the upstream article transitioning onto the selected conveying unit.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for operating a material handling system to achieve desired gapping of conveyed articles, the method comprising:
    sensing, on an infeed conveyor, an initial gap between a lead article and a following article;
    prior to the lead and following articles transporting onto a series of variable speed conveying units, generating, by a computing device, a motion profile for the following article based at least in part on the initial gap between the articles and a target final gap as the articles are discharged from the series of variable speed conveying units; and
    for each interval of time as the lead and following articles are conveyed across the series of variable speed conveying units:
        determining an assigned velocity and a resulting distance that the following article has conveyed on the series of variable speed conveying units based upon the motion profile at the particular interval of time;
        determining a particular conveying unit that corresponds to the resulting distance; and
        controlling, by the computing device, the particular conveying unit to operate at the assigned velocity,
        wherein the motion profile includes a selected one of: (i) an initial gap that is less than the target final gap, (ii) an initial gap that is equal to the target final gap to maintain a gap, and (iii) an initial gap that is greater than the target final gap to create headroom as a gap bank for subsequently received articles.

2. The method of claim 1, wherein generating the motion profile for the following article further comprises:
    determining a motion profile generated for the lead article; and
    adjusting the generated motion profile for the following article to compensate for an overlap with the motion profile of the lead article when the lead and following article are predicted to be on the same conveying unit.

3. The method of claim 1, wherein controlling the particular conveying unit to operate at the assigned velocity further comprises:
    determining based on the respective motion profiles that the lead and following articles will both have a least a portion of their respective length on a selected conveying unit;
    determining which of the lead and following articles have a larger relative proportion of contact area with the selected conveying unit; and
    selecting one of the respective motion profiles for controlling the selected conveying unit based upon the determined larger relative portion of contact area.

4. A method for operating a material handling system to achieve desired gapping of conveyed articles, the method comprising:
    sensing, on an infeed conveyor, an initial gap between a lead article and a following article;
    prior to the lead and following articles transporting onto a series of variable speed conveying units, generating, by a computing device, a motion profile for the following article based at least in part on the initial gap between the articles and a target final gap as the articles are discharged from the series of variable speed conveying units; and for each interval of time as the lead and following articles are conveyed across the series of variable speed conveying units:
  determining an assigned velocity and a resulting distance that the following article has conveyed on the series of variable speed conveying units based upon the motion profile at the particular interval of time;
  determining a particular conveying unit that corresponds to the resulting distance; and
  controlling, by the computing device, the particular conveying unit to operate at the assigned velocity,
wherein generating the motion profile further comprises limiting a jerk in rate of change in acceleration of second article to remain within a threshold amount to prevent sliding of the second article on the series of variable speed conveying units.

5. The method of claim 4, wherein limiting the jerk in the rate of change in acceleration comprises following a selected one of a triangular velocity profile and a curved velocity profile.

6. A method for operating a material handling system to achieve desired gapping of conveyed articles, the method comprising:
  sensing, on an infeed conveyor, an initial gap between a lead article and a following article;
  prior to the lead and following articles transporting onto a series of variable speed conveying units, generating, by a computing device, a motion profile for the following article based at least in part on the initial gap between the articles and a target final gap as the articles are discharged from the series of variable speed conveying units; and
  for each interval of time as the lead and following articles are conveyed across the series of variable speed conveying units:
    determining an assigned velocity and a resulting distance that the following article has conveyed on the series of variable speed conveying units based upon the motion profile at the particular interval of time;
    determining a particular conveying unit that corresponds to the resulting distance;
    controlling, by the computing device, the particular conveying unit to operate at the assigned velocity;
  determining whether a selected conveying unit is empty based on analyzing all active motion profiles at a current time interval;
  in response to determining that the selected conveying unit is empty, determining an adjusted velocity of an adjacent upstream conveying unit according to a motion profile associated with an upstream article when positioned to transition onto the selected conveying unit; and
  adjusting a velocity of the selected conveying unit to reach the adjusted velocity prior to the upstream article transitioning onto the selected conveying unit.

7. A computing device, comprising:
  a processor configured with processor-executable instructions to perform operations comprising:
    sensing on an infeed conveyor an initial gap between a lead article and a following article;
    prior to the lead and following articles transporting onto a series of variable speed conveying units, generating, by a computing device, a motion profile for the following article based at least in part on the initial gap between the articles and a target final gap as the articles are discharged from the series of variable speed conveying units; and
    for each interval of time as the lead and following articles are conveyed across the series of variable speed conveying units:
      determining an assigned velocity and a resulting distance that the following article has conveyed on the series of variable speed conveying units based upon the motion profile at the particular interval of time;
      determining a particular conveying unit that corresponds to the resulting distance; and
      controlling, by the computing device, the particular conveying unit to operate at the assigned velocity,
    wherein the motion profile includes a selected one of:
      (i) an initial gap that is less than the target final gap,
      (ii) an initial gap that is equal to the target final gap to maintain a gap, and (iii) an initial gap that is greater than the target final gap to create headroom as a gap bank for subsequently received articles.

8. The computing device of claim 7, wherein the processor performs operations further comprises generating the motion profile for the following article by:
  determining a motion profile generated for the lead article; and
  adjusting the generated motion profile for the following article to compensate for an overlap with the motion profile of the lead article when the lead and following article are predicted to be on the same conveying unit.

9. The computing device of claim 7, wherein the processor performs operations further comprises controlling the particular conveying unit to operate at the assigned velocity by:
  determining based on the respective motion profiles that the lead and following articles will both have a least a portion of their respective length on a selected conveying unit;
  determining which of the lead and following articles have a larger relative proportion of contact area with the selected conveying unit; and
  selecting one of the respective motion profiles for controlling the selected conveying unit based upon the determined larger relative portion of contact area.

10. A computing device, comprising:
  a processor configured with processor-executable instructions to perform operations comprising:
    sensing on an infeed conveyor an initial gap between a lead article and a following article;
    prior to the lead and following articles transporting onto a series of variable speed conveying units, generating, by a computing device, a motion profile for the following article based at least in part on the initial gap between the articles and a target final gap as the articles are discharged from the series of variable speed conveying units; and
    for each interval of time as the lead and following articles are conveyed across the series of variable speed conveying units:
      determining an assigned velocity and a resulting distance that the following article has conveyed on the series of variable speed conveying units based upon the motion profile at the particular interval of time;
      determining a particular conveying unit that corresponds to the resulting distance; and controlling, by the computing device, the particular conveying unit to operate at the assigned velocity,
wherein the processor performs operations further comprising generating the motion profile by limiting a jerk in rate of change in acceleration of second article to remain within a threshold amount to prevent sliding of the second article on the series of variable speed conveying units.

11. The computing device of claim 10, wherein the processor performs operations further comprising limiting the jerk in the rate of change in acceleration comprises following a selected one of a triangular velocity profile and a curved velocity profile.

12. A computing device, comprising:
a processor configured with processor-executable instructions to perform operations comprising:
sensing on an infeed conveyor an initial gap between a lead article and a following article;
prior to the lead and following articles transporting onto a series of variable speed conveying units, generating, by a computing device, a motion profile for the following article based at least in part on the initial gap between the articles and a target final gap as the articles are discharged from the series of variable speed conveying units; and
for each interval of time as the lead and following articles are conveyed across the series of variable speed conveying units:
determining an assigned velocity and a resulting distance that the following article has conveyed on the series of variable speed conveying units based upon the motion profile at the particular interval of time;
determining a particular conveying unit that corresponds to the resulting distance; and
controlling, by the computing device, the particular conveying unit to operate at the assigned velocity,
wherein the processor performs operations further comprising:
determining whether a selected conveying unit is empty;
in response to determining that the selected conveying unit is empty, determining an adjusted velocity of an adjacent upstream conveying unit according to a motion profile associated with an upstream article when positioned to transition onto the selected conveying unit; and
adjusting a velocity of the selected conveying unit to reach the adjusted velocity prior to the upstream article transitioning onto the selected conveying unit.

13. A material handling system, comprising:
an infeed conveyor to convey a lead article and a following article;
a series of variable speed conveying units to receive the lead article and the following articles that are discharged from the infeed conveyor;
a sensor to detect a gap between the lead and following articles as conveyed on the infeed conveyor;
a computing device in communication with the sensor and the series of variable speed conveying units, the computing device comprising a processor configured with processor-executable instructions to perform operations comprising:
sensing on an infeed conveyor an initial gap between a lead article and a following article;
prior to the lead and following articles transporting onto a series of variable speed conveying units, generating, by a computing device, a motion profile for the following article based at least in part on the initial gap between the articles and a target final gap as the articles are discharged from the series of variable speed conveying units; and
for each interval of time as the lead and following articles are conveyed across the series of variable speed conveying units:
determining an assigned velocity and a resulting distance that the following article has conveyed on the series of variable speed conveying units based upon the motion profile at the particular interval of time;
determining a particular conveying unit that corresponds to the resulting distance; and
controlling, by the computing device, the particular conveying unit to operate at the assigned velocity,
wherein the motion profile includes a selected one of:
(i) an initial gap that is less than the target final gap,
(ii) an initial gap that is equal to the target final gap to maintain a gap, and (iii) an initial gap that is greater than the target final gap to create headroom as a gap bank for subsequently received articles.

14. The material handling system of claim 13, wherein the processor performs operations further comprises generating the motion profile for the following article by:
determining a motion profile generated for the lead article; and
adjusting the generated motion profile for the following article to compensate for an overlap with the motion profile of the lead article when the lead and following article are predicted to be on the same conveying unit.

15. The material handling system of claim 13, wherein the processor performs operations further comprises controlling the particular conveying unit to operate at the assigned velocity by:
determining based on the respective motion profiles that the lead and following articles will both have a least a portion of their respective length on a selected conveying unit;
determining which of the lead and following articles have a larger relative proportion of contact area with the selected conveying unit; and
selecting one of the respective motion profiles for controlling the selected conveying unit based upon the determined larger relative portion of contact area.

16. A material handling system, comprising:
an infeed conveyor to convey a lead article and a following article;
a series of variable speed conveying units to receive the lead article and the following articles that are discharged from the infeed conveyor;
a sensor to detect a gap between the lead and following articles as conveyed on the infeed conveyor;
a computing device in communication with the sensor and the series of variable speed conveying units, the computing device comprising a processor configured with processor-executable instructions to perform operations comprising:
sensing on an infeed conveyor an initial gap between a lead article and a following article;
prior to the lead and following articles transporting onto a series of variable speed conveying units, generating, by a computing device, a motion profile for the following article based at least in part on the initial gap between the articles and a target final gap as the articles are discharged from the series of variable speed conveying units; and for each interval of time as the lead and following articles are conveyed across the series of variable speed conveying units:

determining an assigned velocity and a resulting distance that the following article has conveyed on the series of variable speed conveying units based upon the motion profile at the particular interval of time;

determining a particular conveying unit that corresponds to the resulting distance; and controlling, by the computing device, the particular conveying unit to operate at the assigned velocity, wherein the processor performs operations further comprises generating the motion profile by limiting a jerk in rate of change in acceleration of second article to remain within a threshold amount to prevent sliding of the second article on the series of variable speed conveying units.

17. The material handling system of claim 16, wherein the processor performs operations further comprising limiting the jerk in the rate of change in acceleration by following a selected one of a triangular velocity profile and a curved velocity profile.

18. A material handling system, comprising:

an infeed conveyor to convey a lead article and a following article;

a series of variable seed conveying units to receive the lead article and the following articles that are discharged from the infeed conveyor;

a sensor to detect a gap between the lead and following articles as conveyed on the infeed conveyor;

a computing device in communication with the sensor and the series of variable speed conveying units, the computing device comprising a processor configured with processor-executable instructions to perform operations comprising:

sensing on an infeed conveyor an initial gap between a lead article and a following article;

prior to the lead and following articles transporting onto a series of variable speed conveying units, generating, by a computing device, a motion profile for the following article based at least in part on the initial gap between the articles and a target final gap as the articles are discharged from the series of variable speed conveying units; and for each interval of time as the lead and following articles are conveyed across the series of variable speed conveying units:

determining an assigned velocity and a resulting distance that the following article has conveyed on the series of variable speed conveying units based upon the motion profile at the particular interval of time;

determining a particular conveying unit that corresponds to the resulting distance; and controlling, by the computing device, the particular conveying unit to operate at the assigned velocity, wherein the processor performs operations further comprising:

determining whether a selected conveying unit is empty;

in response to determining that the selected conveying unit is empty, determining an adjusted velocity of an adjacent upstream conveying unit according to a motion profile associated with an upstream article when positioned to transition onto the selected conveying unit; and adjusting a velocity of the selected conveying unit to reach the adjusted velocity prior to the upstream article transitioning onto the selected conveying unit.

* * * * *